United States Patent [19]
Kasahara et al.

[11] Patent Number: 6,093,104
[45] Date of Patent: Jul. 25, 2000

[54] VIDEO GAME SYSTEM FOR PLAYING VIDEO GAME FOR REMOVING DISPLAYED LIKE OBJECTS FROM GAME FIELD WHEN THEY ARE SUCCESSIVE CONNECTED

[75] Inventors: Shinichi Kasahara, Hokkaido; Hideyuki Tsujimoto, Saitama-ken; Tomonori Matsumoto, Chiba-ken; Yasuyuki Nakane, Saitama-ken; Toshio Kohira, Chiba-ken; Masaki Yoshino, Tokyo; Junichi Ishida, Saitama-ken, all of Japan

[73] Assignee: Konami Co., Ltd., Hyogo-ken, Japan

[21] Appl. No.: 08/872,557

[22] Filed: Jun. 10, 1997

[30] Foreign Application Priority Data

Jun. 18, 1996 [JP] Japan .................................... 8-178512
Apr. 3, 1997 [JP] Japan .................................... 9-100890

[51] Int. Cl.[7] ........................................................ A63F 9/22
[52] U.S. Cl. ................................... 463/30; 463/36; 463/9; 273/434
[58] Field of Search ................................. 463/30–36, 43, 463/9; 273/144 A, 153 R, 157 R, 434, 435

[56] References Cited

U.S. PATENT DOCUMENTS 4,961,579  10/1990  Thompson et al. ................. 273/153 R
5,265,888  11/1993  Yamamoto et al. .................... 273/434

Primary Examiner—Jessica J. Harrison
Assistant Examiner—Sheila Clayton
Attorney, Agent, or Firm—Jordan and Hamburg LLP

[57] ABSTRACT

A video game is played on a video game system by moving objects successively introduced into a game field in one direction on a display screen, determining whether a leading object or a leading cluster of objects introduced into the game field reach a predetermined position in the display screen or a memory, and ending the video game if the leading object or the leading cluster of objects introduced into the game field reaches the predetermined position. It is determined whether objects of one type are successively connected in the game field or not. The objects of one type are removed from the game field if they are successively connected in the game field. An object present ahead of the removed objects in the direction is moved in a direction opposite to the direction. An object indicated by a cursor is exchanged for an object present in the game field.

46 Claims, 38 Drawing Sheets

FIG. 3A

| ad, STORAGE ADDRESS, TYPE, DISPLAY ADDRESS |
|---|
| |
| |

FIG. 3B

| NUMBER OF PIECES | DATA INDICATING TYPES OF PIECES |
|---|---|
| 1 | RL (RED LARGE PIECE) |
| ⋮ | ⋮ |
| n | RS (RED SMALL PIECE), GL (GREEN LARGE PIECE) ... |

FIG. 3C, FIG. 3D — ATTACK PIECE TYPE DATA

FIG. 3E, FIG. 3F — ATTACK PIECE TYPE DATA

FIG. 3G

F I G. 4
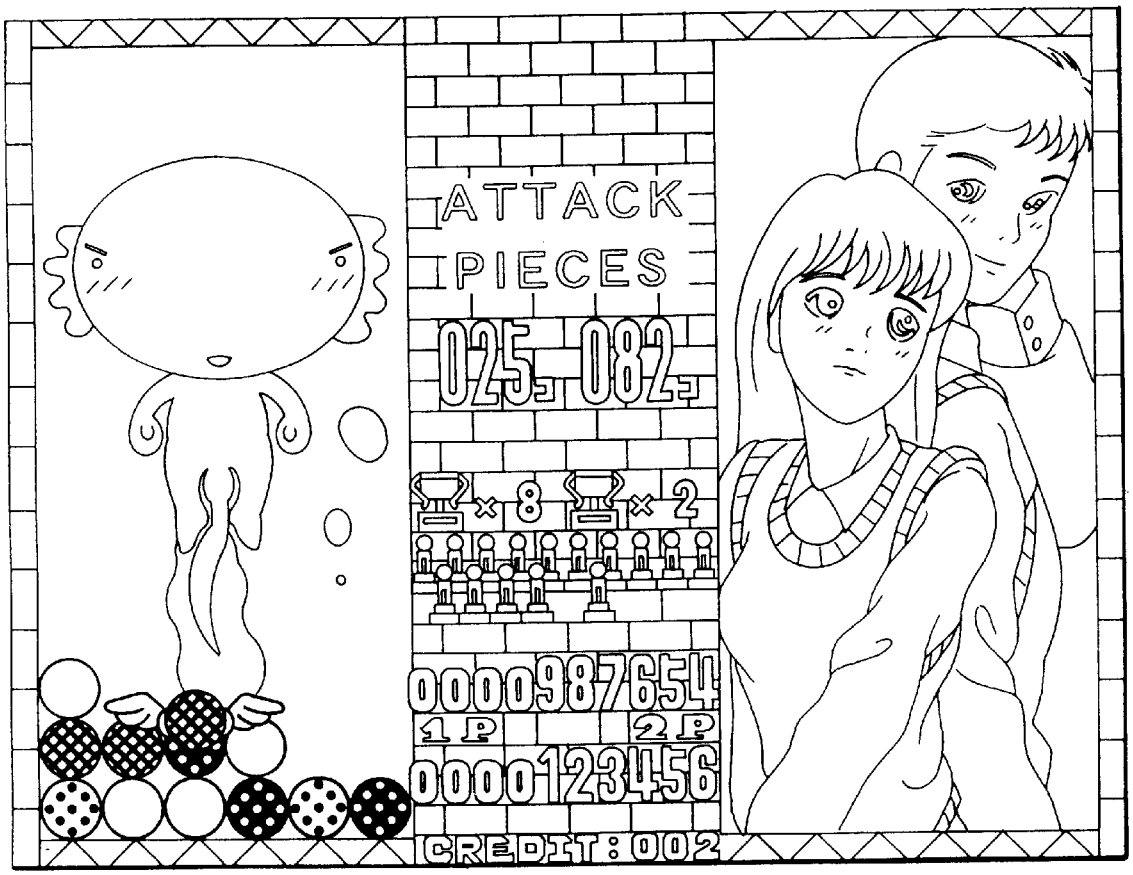

F I G. 10
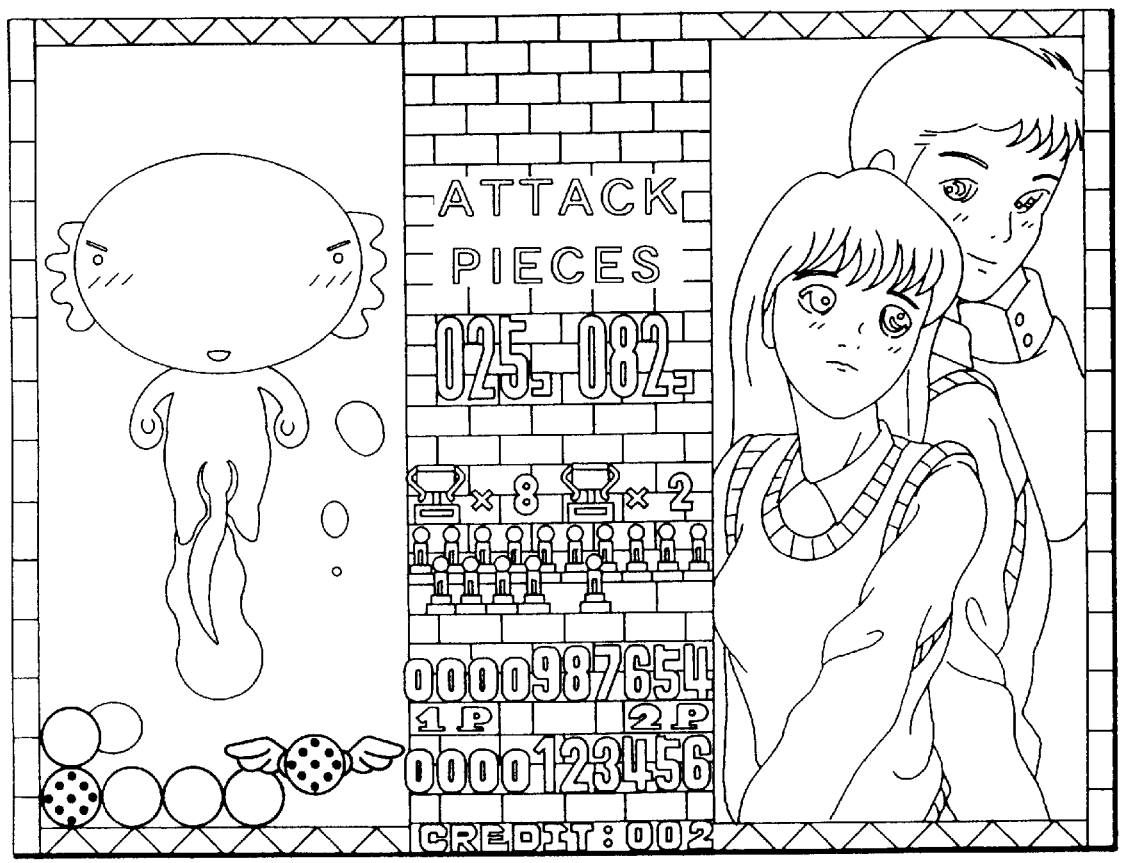

F I G. 11
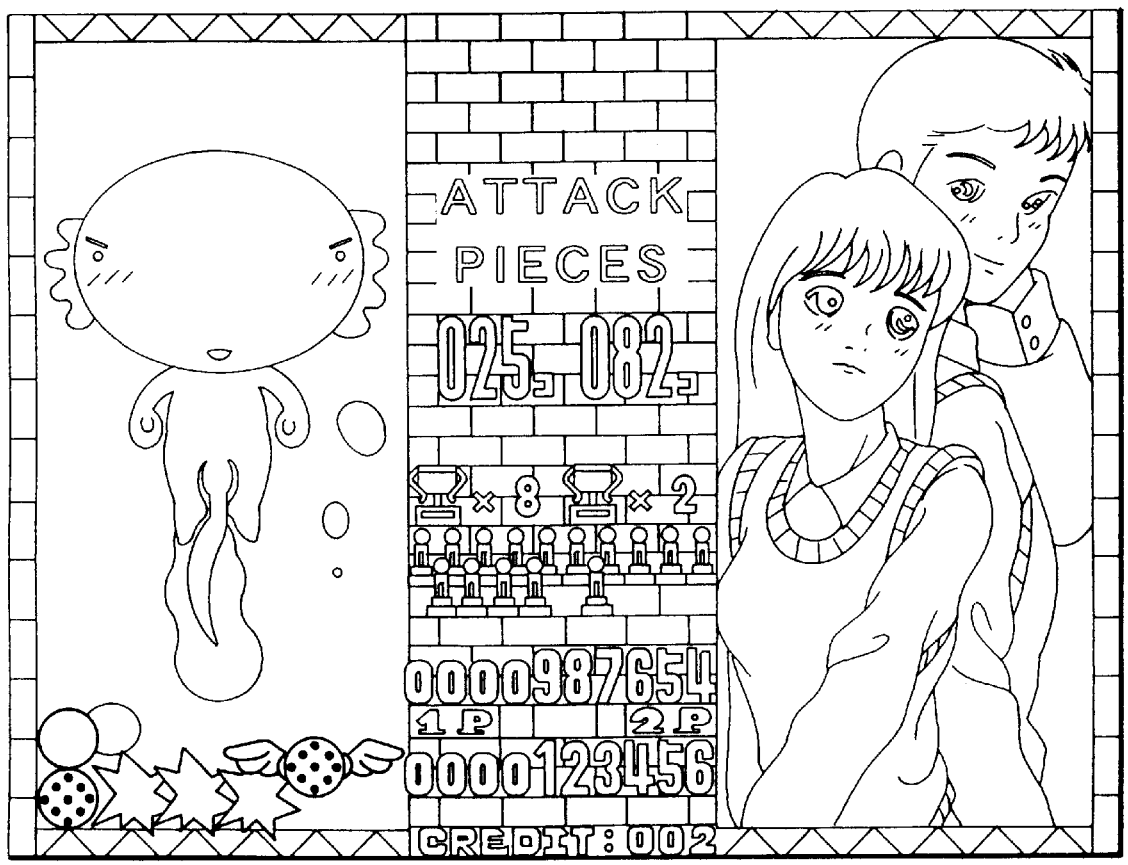

F I G. 13
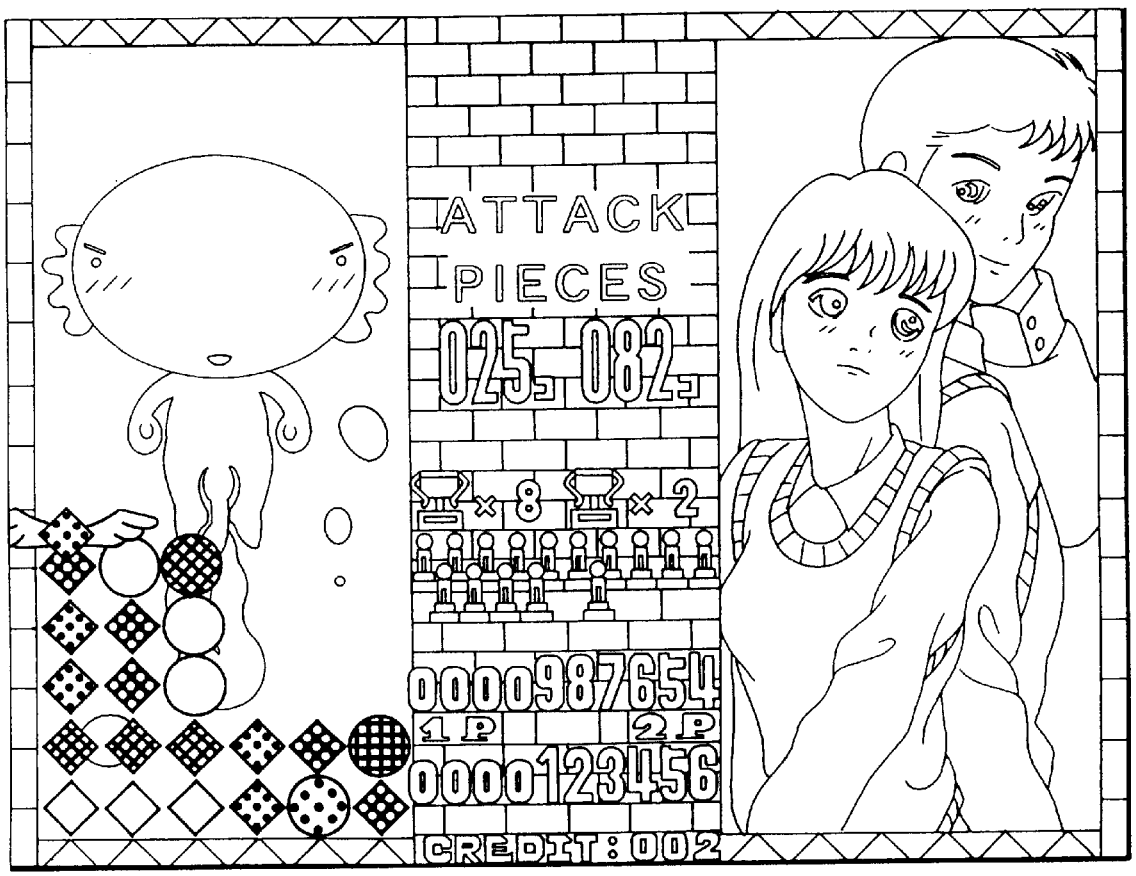

F I G. 14
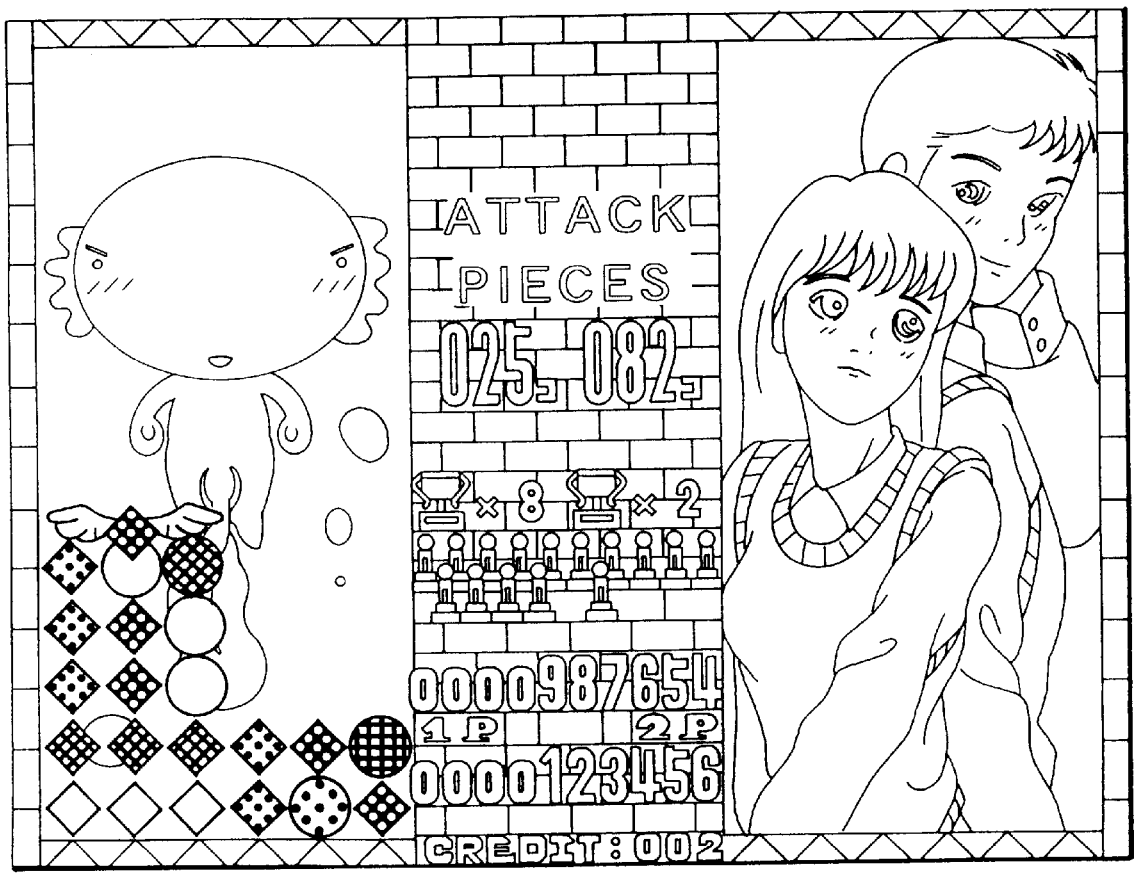

F I G. 15
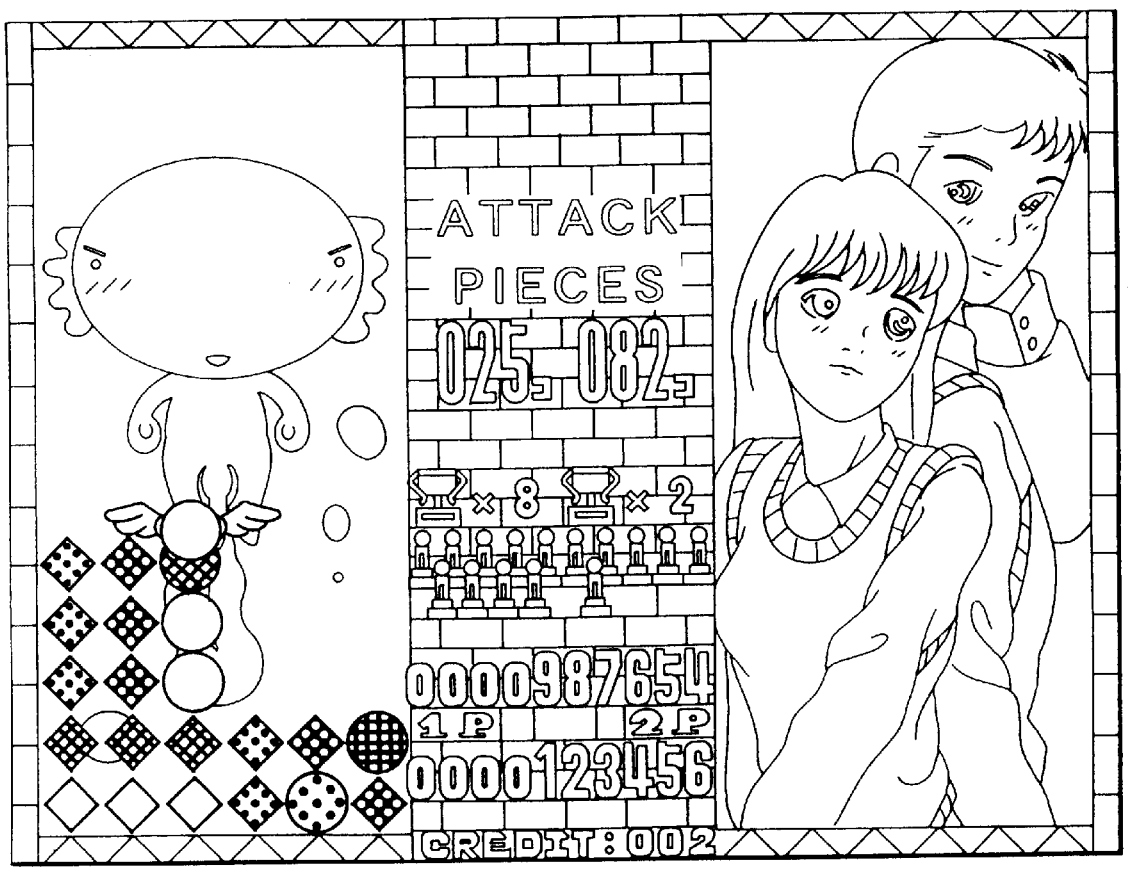

PIECE IN RESERVE

VIDEO GAME SYSTEM FOR PLAYING VIDEO GAME FOR REMOVING DISPLAYED LIKE OBJECTS FROM GAME FIELD WHEN THEY ARE SUCCESSIVE CONNECTED

BACKGROUND OF THE INVENTION

1. Field of the Invention

The present invention relates to a video game system for playing a video game for removing displayed objects such as large circular pieces from a game field when the objects are successively connected, and more particularly to a method of moving objects in such a video game, a video game apparatus, a video game system, and recording medium which stores game program data for such a video game.

2. Description of the Prior Art

Many various video game systems have been proposed in the art. They include, among others, a video game system comprising a video game unit for home use and a television monitor combined therewith, a video game machine for business use, a video game system comprising a personal computer or a work station, a display monitor, and an audio output device. These video game systems are commonly made up of a manual controller operable by the game player, a recording medium which stores game data comprising game program data and video and audio data, a central processing unit (CPU) for generating video and audio data based on the game program data, a video processor for processing the video data, an audio processor for processing the audio data, a cathode-ray tube (CRT) for displaying images based on the video data, and a speaker or speakers for outputting sounds based on the audio data. The recording medium typically comprises a CD-ROM, a semiconductor memory, a cassette housing a semiconductor memory, etc.

Video games that can be played on video game systems are available in a growing number of different types, and their rules are rapidly becoming more complex and diverse. One particular kind of video games which have been proposed in many different forms challenges the game player to handle successively falling pieces.

In such a video game, pieces that appear at the top of the display screen successively drop and stop when they hit the bottom or pieces that have already been dropped. Unless removed from the display screen, the dropped pieces are piled up to the top when the game ends. Dropped blocks will be removed if they are arranged in a certain sequence. In order to stay in the game, the game player will operate the controller to move a falling block so that it matches with neighboring pieces in a horizontal pattern, for example, without gaps.

According to one similar video game, pieces of different colors successively appear at the top of the display screen and drop when they hit the bottom or pieces that have already been dropped. If at least a predetermined number of dropped pieces of one color are connected, then they are all removed from the display screen. The game player will operate the controller to move dropped pieces with a displayed cursor to a position where they are connected to other dropped pieces of the same color for thereby eliminating the connected pieces of the same color.

The basic rule of those video games which handle falling objects is that the game ends when the dropped objects are piled up to the top of the screen unless removed from the display screen by the game player. These video games are played basically on the same principles except for shapes and colors of falling objects and patterns in which dropped objects can be removed. There has been a demand for a new video game which handle falling pieces.

SUMMARY OF THE INVENTION

It is therefore an object of the present invention to provide a video game system which will solve the problems of the conventional video game systems.

According to an aspect of the present invention, there is provided a method of moving an object in a video game, comprising the steps of moving objects successively introduced into a game field in one direction on a display screen, determining whether a leading object or a leading cluster of objects introduced into the game field reach a predetermined position in the display screen or a memory, ending the video game if the leading object or the leading cluster of objects introduced into the game field reaches the predetermined position, determining whether objects of one type are successively connected in the game field or not, removing the objects of one type from the game field if they are successively connected in the game field, moving an object present ahead of the removed objects in the direction in a direction opposite to the direction, and exchanging an object indicated by a cursor for an object present in the game field.

According to another aspect of the present invention, there is provided a video game apparatus comprising a controller manually operable by a game player, display means for displaying images on a display screen thereof, a recording medium storing game program data, and control means for controlling a video game based on the game program data read from the recording medium and operation of the controller manually operated by the game player, the control means comprising means controlled by the game program data, for moving objects successively introduced into a game field in one direction on the display screen, determining whether a leading object or a leading cluster of objects introduced into the game field reach a predetermined position in the display screen or a memory, ending the video game if the leading object or the leading cluster of objects introduced into the game field reaches the predetermined position, determining whether objects of one type are successively connected in the game field or not, removing the objects of one type from the game field if they are successively connected in the game field, moving an object present ahead of the removed objects in the direction in a direction opposite to the direction, and exchanging an object indicated by a cursor for an object present in the game field.

According to a still another aspect of the present invention, there is provided a video game system for moving an object in a video game, comprising display means for displaying a game field on a display screen thereof, a controller manually operable by a game player for controlling a cursor in the game field displayed by the display means, and control means for moving objects successively introduced into a game field in one direction on the display screen, determining whether a leading object or a leading cluster of objects introduced into the game field reach a predetermined position in the display screen or a memory, ending the video game if the leading object or the leading cluster of objects introduced into the game field reaches the predetermined position, determining whether objects of one type are successively connected in the game field or not, removing the objects of one type from the game field if they are successively connected in the game field, moving an object present ahead of the removed objects in the direction in a direction opposite to the direction, and exchanging an object indicated by the cursor for an object present in the game field.

According to a yet still another aspect of the present invention, there is provided a recording medium storing game program data readable by a computer for moving objects successively introduced into a game field in one direction on the display screen, determining whether a leading object or a leading cluster of objects introduced into the game field reach a predetermined position in the display screen or a memory, ending the video game if the leading object or the leading cluster of objects introduced into the game field reaches the predetermined position, determining whether objects of one type are successively connected in the game field or not, removing the objects of one type from the game field if they are successively connected in the game field, moving an object present ahead of the removed objects in the direction in a reverse direction opposite to the direction, extracting an object indicated by a cursor from the game field, positioning an object present ahead of a position from which the object is extracted in the direction into the position, removing objects from the image field if the objects of the same type as the object positioned in the position are successively connected, measuring a predetermined period of time, moving an object in the game field by a predetermined distance in the direction if the predetermined period of time is measured, determining whether there is a leading piece in the game field in the direction or not, and determining that the game is to be ended if there is a leading piece as determined in the game field in the direction.

According to a further aspect of the present invention, there is provided a video game apparatus comprising means for changing positions of objects displayed in a game field on a display screen, means for removing objects of one type from the game field if the objects are successively connected, and means for establishing a condition to remove objects from the game field, displaying at least as many objects as the number of objects removable under the conditions in a pattern removable under the condition, and determining whether the condition is satisfied or not by a game player of the video game apparatus.

According to a still further aspect of the present invention, there is provided a video game apparatus comprising a controller manually operable by a game player, display means for displaying images on a display screen thereof, a recording medium storing game program data readable by a computer, and control means for controlling a video game based on the game program data read from the recording medium and operation of the controller manually operated by the game player, the control means comprising means controlled by the game program data, for establishing a condition for removing objects from a game field on the display screen, determining whether objects of one type are successively connected or not, removing objects of one type if the objects of one type are determined as being successively connected, exchanging an object indicated by a cursor for an object in the game field, and determining whether the objects are removed from the game field under the condition or not.

According to a yet still further aspect of the present invention, there is provided a recording medium storing game program data readable by a computer for changing positions of objects displayed in a game field on a display screen, removing objects of one type from the game field if the objects are successively connected, establishing a condition to remove objects from the game field, determining whether objects of one type are successively connected, removing objects of one type from the game field if the objects of one type are determined as being successively connected, exchanging an object indicated by a cursor for an object in the game field, and determining whether the objects are removed from the game field under the condition or not.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3A is a diagram showing by way of example data stored in data registers;

FIG. 3B is a diagram showing by way of example a table of data indicative of piece types depending on the number of pieces;

FIG. 3C is a diagram showing by way of example a map indicative of a field of a game player;

FIG. 3D is a diagram showing by way of example an attack piece information area for storing type data of an attack piece from an opponent game player;

FIG. 3E is a diagram showing by way of example a map indicative of a field of the opponent game player;

FIG. 3F is a diagram showing by way of example an attack piece information area for storing type data of an attack piece from the game player;

FIG. 3G is a diagram showing by way of example a marking map;

FIGS. 4 through 6 are views showing images displayed on the television monitor when three large pieces of the same color are connected horizontally by exchanging a large piece given beforehand to the game player for another large piece in the field and those three large pieces are removed from the field;

FIGS. 10 through 12 are views showing images displayed on the television monitor when three large pieces of the same color are connected horizontally by the fall of a large piece after removal of the three horizontally connected pieces and those three large pieces are removed from the field;

FIGS. 13 through 15 are views showing images displayed on the television monitor when three large pieces of the same color are connected horizontally by the conversion into a large piece from a small piece positioned contiguous to the removed three horizontally connected pieces and those three large pieces are removed from the field;

DETAILED DESCRIPTION OF THE PREFERRED EMBODIMENTS

Figure 1:
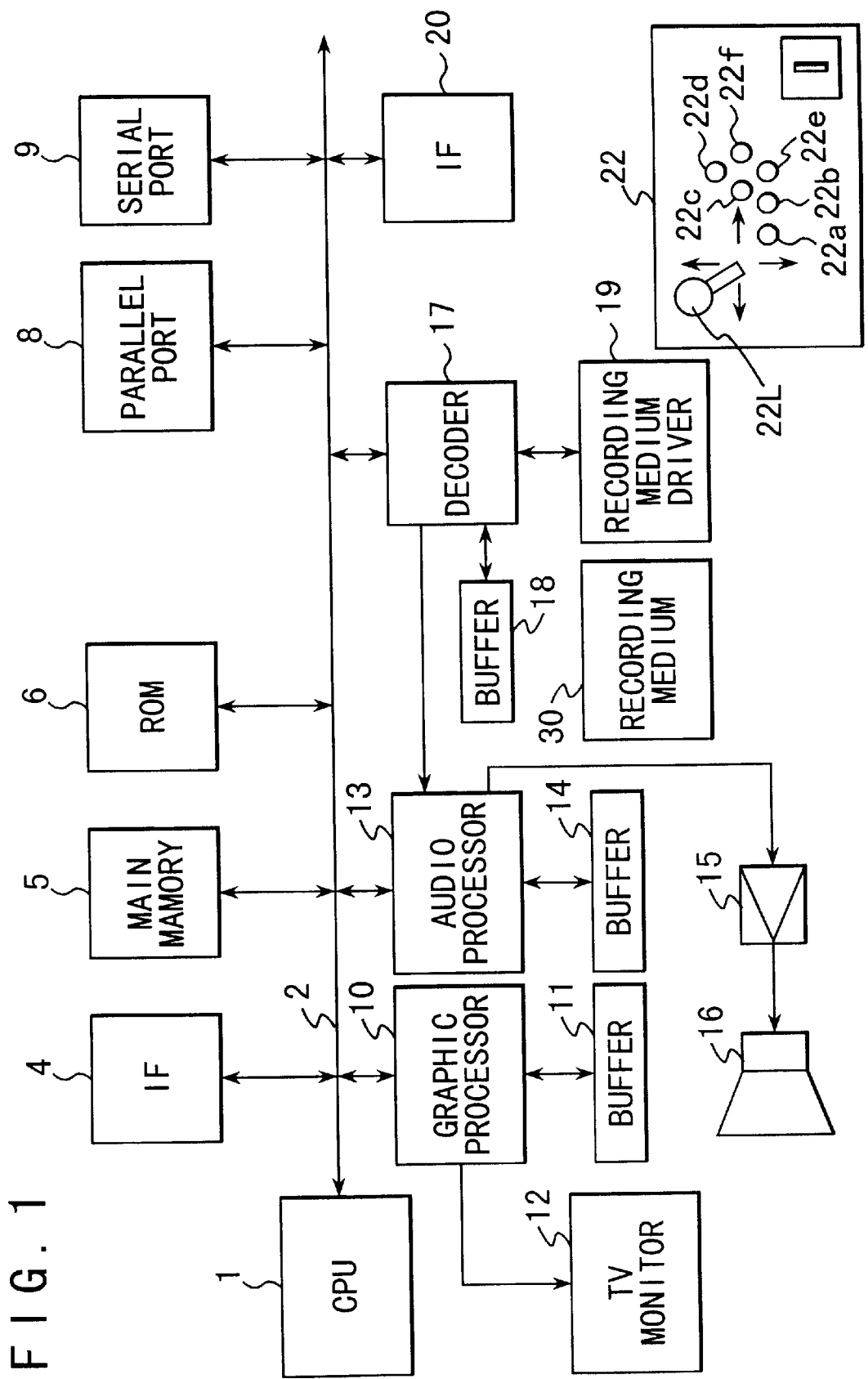
FIG. 1 is a block diagram of a video game system according to a first embodiment of the present invention.

1st Embodiment:

A video game system according to a first embodiment of the present invention operates as follows:

A video game played on the video game system is a competitive video game which is played basically by two game players who compete with each other for the win. When the video game is played by one game player, however, the game player competes with a central processing system (CPU) of the video game system.

When the video game starts being played on the video game system, large and small pieces of arbitrary size and color gradually move upwardly from the bottom of a field of the game player on the display screen. When the upper end of the cluster of large and small pieces that are gradually moving upwardly reaches the upper end of the field or a certain position above the upper end of the field, the video game ends. Each of the game players is given one large piece for exchange, and can exchange the exchange piece for any one of the pieces in the field by operating a controller. At the start of the video game, the game player is given an exchange piece held by a displayed cursor, and when the game player indicates a piece-free area in the field while holding the exchange piece with the cursor, the exchange piece falls from the cursor vertically in the field. At this time, the cursor holds no exchange piece. If the game player then selects a piece in the field, the cursor holds the selected piece as an exchange piece.

When the game player exchanges the large exchange piece for a piece in the field and the large exchange piece that has entered the field is connected to a large piece of the same type as the large exchange piece, all the connected large pieces are removed from the field. When another large piece that has moved by the removal of the connected large pieces is connected to a large piece of the same type as the large piece that has moved, these connected pieces are removed from the field. Similarly, connected large pieces are removed in a chain reaction from the field. As many pieces as the number of the pieces removed from the field of the game player are added to the field of the opponent game player. All small pieces that are contiguous to the removed large pieces change to large pieces. An event of removal of all large pieces of the same type as they are connected will be referred to as a "chain." If, for example, 12 red pieces that are connected are removed and thereafter 10 red pieces that are connected are removed, then the number of chains is "2." The number of large pieces that are removed in one chain will be referred to as a "removal count." The term "exchange" used herein means either (1) an exchange between a piece present in the field and a piece-free state held by the cursor, i.e., holding a piece present in the field with the cursor, (2) an exchange between a piece-free state in the field and a piece held by the cursor, i.e., returning the piece held by the cursor to the field, or (3) an exchange between a piece present in the field and a piece held by the cursor.

FIG. 1 shows in block form a video game system according to a first embodiment of the present invention. As shown in FIG. 1, the video game system generally comprises a game machine assembly and a recording medium 30 which stores game program data, graphic image data, and audio data. The game machine assembly comprises a CPU 1, a bus 2 connected to the CPU 1 and comprising an address bus, a data bus, and a control bus, an interface 4 connected to the bus 2, a main memory 5 connected to the bus 2, a read-only memory (ROM) 6 connected to the bus 2, a parallel port 8 connected to the bus 2, a serial port 9 connected to the bus 2, a graphic processor 10 connected to the bus 2, a buffer 11 connected to the graphic processor 10, a television monitor 12 connected to the graphic processor 10, an audio processor 13 connected to the bus 2, a buffer 14 connected to the audio processor 13, an amplifier 15 connected to the audio processor 13, a speaker 16 connected to the amplifier 15, a decoder 17 connected to the bus 2, a buffer 18 connected to the decoder 17, a recording medium driver 19 connected to the decoder 17, an interface 20 connected to the bus 2, and a controller 22 connected to the interface 20. The recording medium 30 is set in the recording medium driver 19.

The video game system may take different system configurations depending on the manner in which it is used. If the video game system is used as a video game system for home use, for example, then the television monitor 12 and the speaker 16 are separate from the other parts of the game machine assembly with no coin slot on the controller 22. If the video game system is used as a video game system for business use, for example, then all the parts shown in FIG. 1 are assembled as a unit and encased in a single housing. If the video game system is constructed around a personal computer or a work station, then the television monitor 12 corresponds to the display monitor of the computer, the graphic processor 10 and the audio processor 13 correspond to part of the game program data stored in the recording medium 30 or a hardware arrangement on an expansion board inserted in an expansion slot of the computer, and the interface 4, the parallel port 8, the serial port 9, and the interface 20 correspond to a hardware arrangement on an expansion board inserted in an expansion slot of the computer. The buffers 11, 14, 18 correspond to respective areas of the main memory 5 or an expansion memory (not shown). In the illustrated embodiment, the video game system will be described as a video game system for business use.

The various parts of the video game system shown in FIG. 1 will be described below.

The interface 4 serves as an interface for use with a peripheral device such as a pointing device such as a mouse, a track piece, or the like. The ROM 6 stores game program data as an operating system for the game system. The game program data in the ROM 6 correspond to a BIOS (Basic Input Output System) in a personal computer.

The graphic processor 10 effects a graphic processing on data contained in data registers in the main memory 5. The buffer 11 has a display area and a non-display area. The non-display area is an area for storing image data read from the recording medium 30.

The audio processor 13 stores PCM data read from the recording medium 30 in the buffer 14 and uses the PCM data stored in the buffer 14 as a sound source. The audio processor 13 reads the PCM data from the buffer 14, processes the PCM data, and outputs the processed PCM data as sounds from the speaker 16.

The recording medium driver 19 may comprise a hard disk drive, an optical disk drive, a flexible disk drive, a silicon disk drive, a cassette reader, or the like, and the recording medium 30 may comprise a hard disk, an optical disk, a flexible disk, a semiconductor memory, or the like. The recording medium driver 19 reads graphic image data, audio data, and game program data from the recording medium 30, and supplies the read data to the decoder 17. The decoder 17 effects an error-correcting process on the data from the recording medium driver 19 with an ECC (Error-Correcting Code), and supplies the error-corrected data to the main memory 5 or the audio processor 13.

The controller 22 has a lever 22L, a start button 22a, a select button 22b, a first button 22c, a second button 22d, a third button 22e, a fourth button 22f, and a coin insertion slot 22g. The lever 22L is manipulated by the game player to give the CPU 1 commands indicative of upward, downward, leftward, and rightward directions. The start button 21a is pressed by the game player to instruct the CPU 1 to start the game program data loaded from the recording medium 30. The select button 22b is pressed by the game player to instruct the CPU 1 to make various selections relative to the game program data which are loaded from the recording medium 30 to the main memory 5. The lever 22L and the first–fourth buttons 22c, 22d, 22e, 22f have functions which differ depending on the game program data which are loaded from the recording medium 30.

Operation of the video game system will briefly be described below. When a power supply switch (not shown) of the video game system is turned on, the video game system is energized. If the recording medium 30 is inserted in the recording medium driver 19, then the CPU 1 instructs the recording medium driver 19 to read the game data from the recording medium 30 based on the operating system stored in the ROM 6. The recording medium driver 19 then reads the graphic image data, audio data, and game program data from the recording medium 30. The graphic image data, audio data, and game program data that are read are supplied to the decoder 17, which effects an error-correcting process on the supplied data. The error-corrected data are supplied through the bus 2 to the graphic processor 10, and written in the non-display area of the buffer 11 by the graphic processor 10.

The audio data that have been error-corrected by the decoder 17 are supplied to the main memory 5 or the audio processor 13, and stored in the main memory 5 or the buffer 14. The game program data that have been error-corrected by the decoder 17 are supplied to and stored in the main memory 5. Subsequently, the CPU 1 executes the video game based on the game program data stored in the main memory 5 and commands entered into the controller 22 by the game player. Specifically, the CPU 1 controls image processing, audio processing, and internal processing operations based on commands entered into the controller 22 by the game player.

A process of displaying an image on the television monitor 12 will be described below. The CPU 1 writes frames of data comprising storage addresses of the image to be displayed, type data indicative of colors and sizes of pieces, and display addresses of the pieces, alternately into two data registers in the main memory 5. The CPU 1 then supplies the data from one of the two data registers to the graphic processor 10. Based on the supplied data, the graphic processor 10 reads image data from the non-display area of the buffer 11 and writes the image data into the display area of the buffer 11. The graphic processor 10 then reads the image data from the display area of the buffer 11, encodes the image data into an NTSC color television signal, for example, and supplies the NTSC color television signal to the television monitor 12 for thereby displaying the image on the display screen thereof.

Figure 2:
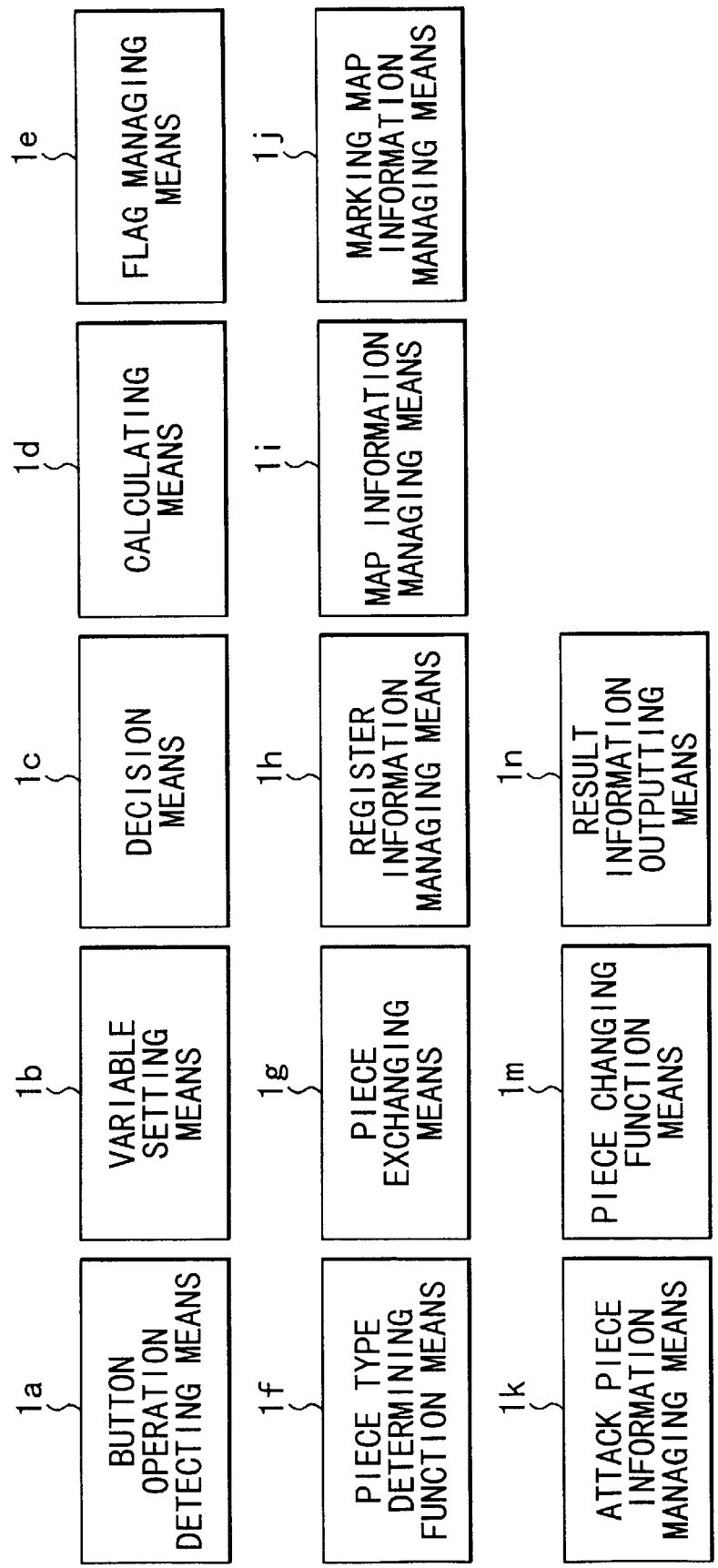
FIG. 2 is a block diagram showing functions performed by a CPU in the video game system shown in FIG. 1.

FIG. 2 shows functions or means performed by the CPU 1 shown in FIG. 1. The CPU 1 performs the functions or means shown in FIG. 2 when it reads the game program data which have been read from the recording medium 30 and stored in the main memory 5. As shown in FIG. 2, the functions or means performed by the CPU 1 include a button operation detecting function or means 1a, a variable setting function or means 1b, a decision function or means 1c, a calculating function or means 1d, a flag managing function or means 1e, a piece type determining function or means 1f, a piece exchanging function or means 1g, a register information managing function or means 1h, a map information managing function or means 1i, a marking map information managing function or means 1j, an attack piece information managing function or means 1k, a piece changing function or means 1m, and a result information outputting function or means 1n. These functions or means will serve as control functions or means in various processes which will be described later on.

FIG. 3A shows by way of example data stored in the two data registers in the main memory 5. The data registers store storage address data representative of addresses in the non-display area of the buffer 11, type data representative of types of image data, and display address data representative of addresses in the display area of the buffer 11, for each image to be displayed. The two data registers alternately store the data of image frames.

FIG. 3B shows a table of data indicative of piece types depending on the number of pieces. The table shown in FIG. 3B is recorded in the recording medium 30. When the video game system is turned on, the table is read from the recording medium 30 and stored in the main memory 5. The table contains data indicative of piece types depending on the number of pieces. The table serves to have ready pieces depending on the number of pieces which the game player has acquired for dropping into the field of the opponent game player. The pieces whose piece types are stored in the table are referred to as "attack pieces" that will be described later on.

FIG. 3C shows a map indicative of the field of the game player. The map, which is created in the main memory 5, can contain data for displaying 6 pieces in an x direction and 13 pieces in a y direction, thus a total of 78 pieces, in the field. The map has addresses x that increase horizontally to the right and addresses y that increase upwardly. The map has a matrix of storage areas corresponding to the positions in the display area of the buffer 11. Each of the storage areas of the map stores either "0" indicating no piece in the corresponding position in the display area of the buffer 11 or an address "Ad" indicating a piece in the corresponding position in the display area of the buffer 11, showing an address of the data registers where the data of the piece is stored.

FIG. 3D shows an attack piece information area in the main memory 5 for storing type data of an attack piece from the opponent game player.

FIG. 3E shows a map indicative of the field of the opponent game player. The map, which is created in the main memory 5, can contain data for displaying 6 pieces in an x direction and 13 pieces in a y direction, thus a total of 78 pieces, in the field. The map has addresses x that increase horizontally to the right and addresses y that increase upwardly. The map has a matrix of storage areas corresponding to the positions in the display area of the buffer 11. Each of the storage areas of the map stores either "0" indicating no piece in the corresponding position in the display area of the buffer 11 or an address "Ad" indicating a piece in the corresponding position in the display area of the buffer 11, showing an address of the data registers where the data of the piece is stored.

FIG. 3F shows an attack piece information area in the main memory 5 for storing type data of an attack piece from the game player.

FIG. 3G shows a marking map which stores information indicative of whether or not a large piece is connected to and of the same type as a large piece which has been introduced into the field by an exchange or moved in the field by removal of large pieces. In the example shown in FIG. 3G, connected large pieces of the same type are marked with "1." The CPU 1 refers to the marking map to determine whether large pieces are connected or not. In this embodiment, it is assumed that when three or more large pieces of the same type are connected, they are removed from the field.

FIGS. 4 through 15 show by way of example images displayed on the television monitor 12 when three large pieces of the same color are removed when they are connected horizontally.

Figure 5:
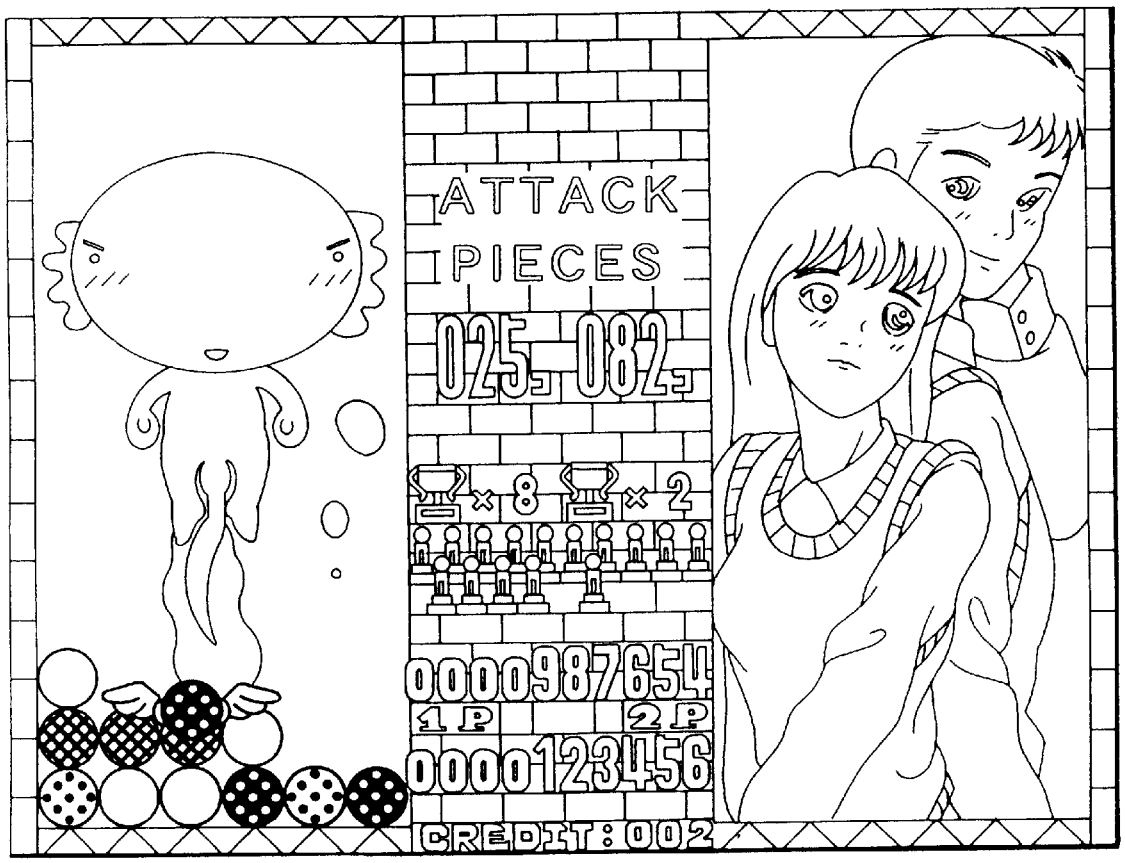
Figure 6:
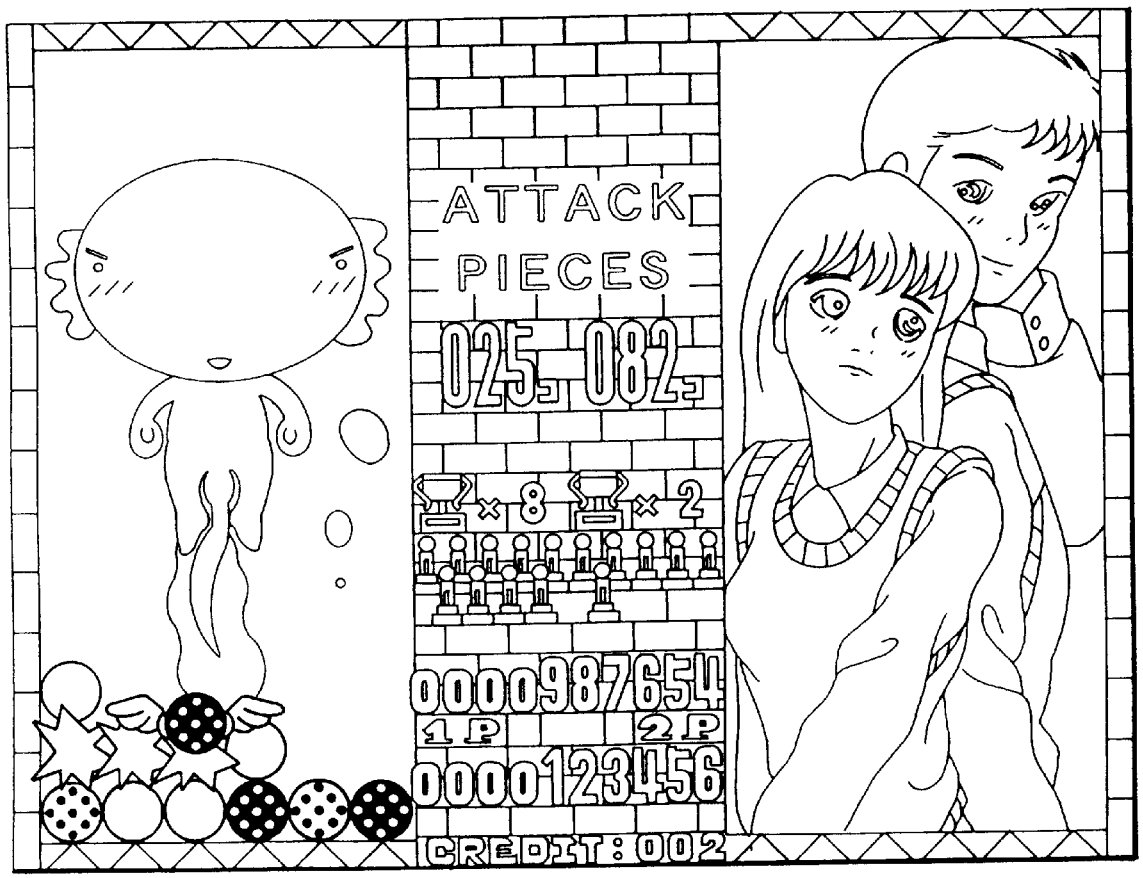
Figure 7:
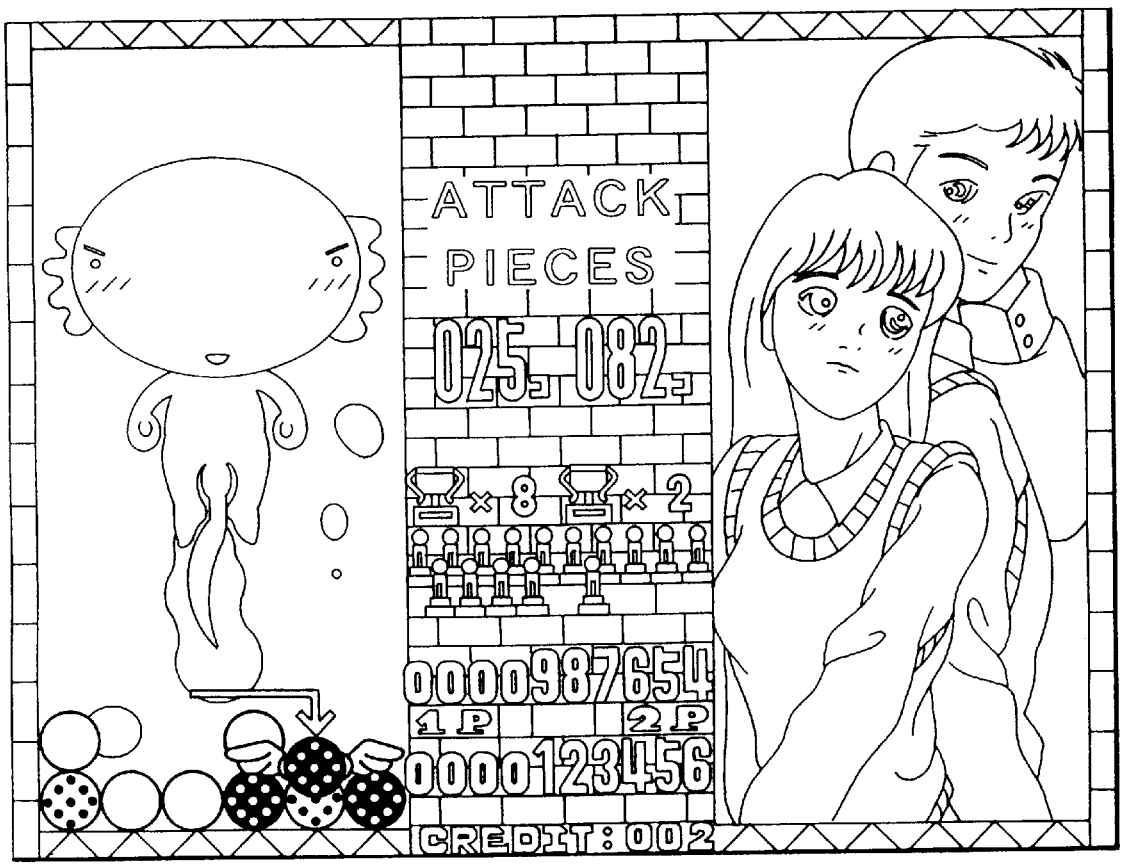
FIGS. 7 through 9 are views showing images displayed on the television monitor when three large pieces of the same color are connected horizontally by exchanging a large piece newly given to the game player for another large piece in the field and those three large pieces are removed from the field.
Figure 8:
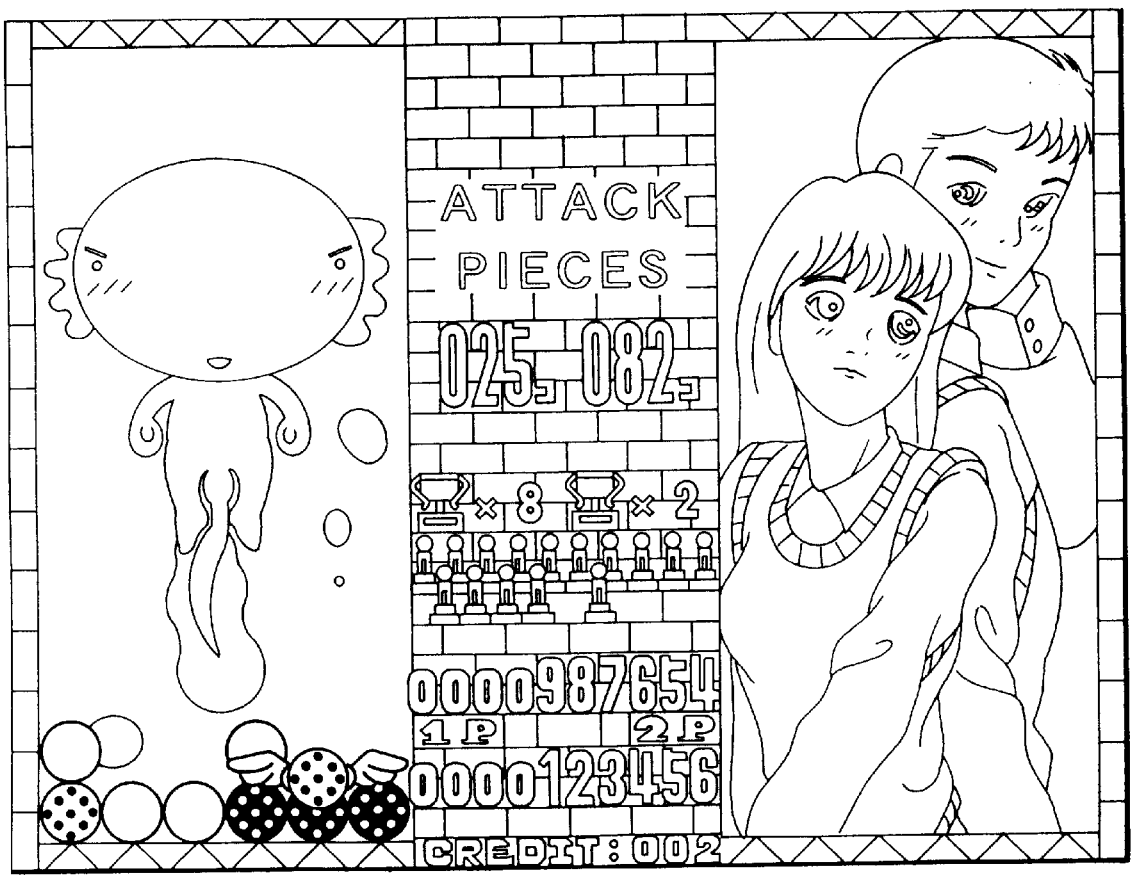
Figure 9:
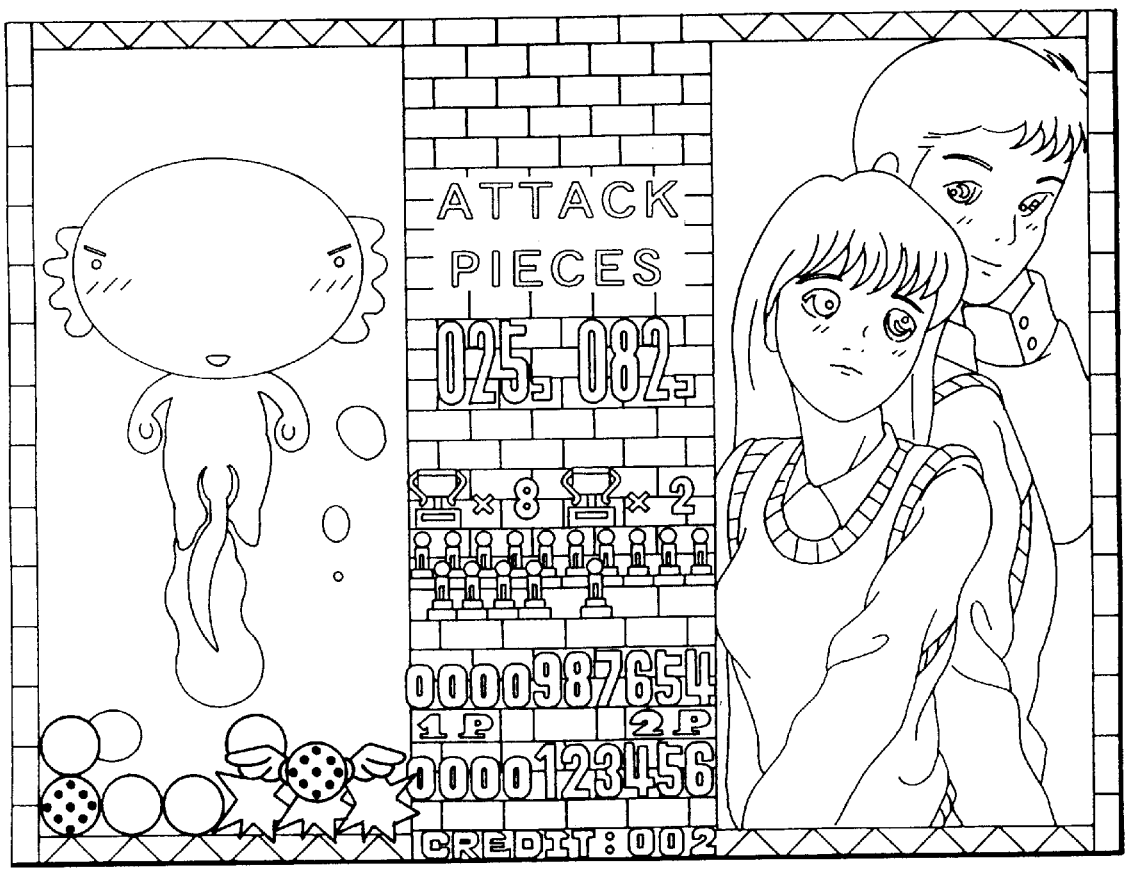
Figure 12:
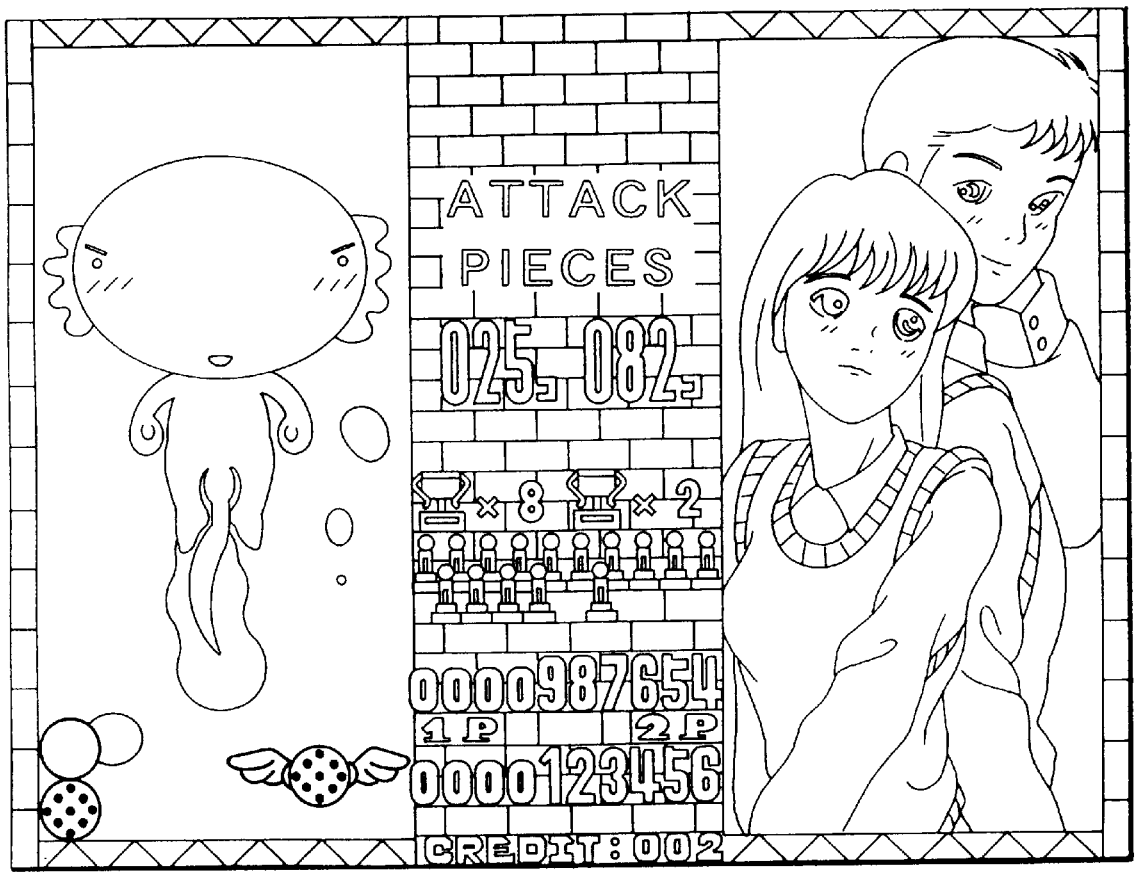

Specifically, FIGS. 4 through 6 show images displayed on the television monitor 12 when three large pieces of the same color are connected horizontally by exchanging a large piece given beforehand to the game player for another large piece in the field and those three large pieces are removed from the field. FIGS. 7 through 9 show images displayed on the television monitor 12 when three large pieces of the same color are connected horizontally by exchanging a large piece newly given to the game player for another large piece in the field and those three large pieces are removed from the field. FIGS. 10 through 12 show images displayed on the television monitor 12 when three large pieces of the same color are connected horizontally by the fall of a large piece after removal of the three horizontally connected pieces and those three large pieces are removed from the field. FIGS. 13 through 15 show images displayed on the television monitor 12 when three large pieces of the same color are connected horizontally by the conversion into a large piece from a small piece positioned contiguous to the removed three horizontally connected pieces and those three large pieces are removed from the field.

The displayed images shown in FIGS. 4 through 15 will successively be described below. As shown in FIG. 4, the display screen of the television monitor 12 displays a central score area for displaying scores, the field of the game player on one side of the central score area, and the field of the opponent game player on the other side of the central score area. For illustrative purpose, large pieces are displayed as circles only in the field of the game player. Actually, colored pieces are displayed on the display screen of the television monitor 12. In FIGS. 4 through 15, white large pieces are shown as blank large pieces, gray large pieces as black large pieces with fine white dots, yellow large pieces as blank large pieces with coarse black dots, and brown large pieces as black large pieces with coarse white dots. Small pieces are shown as lozenged pieces with the same color indicating patterns as the large pieces.

In FIG. 4, the field contains a yellow large piece, a white large piece, a white large piece, a brown large piece, a yellow large piece, and a brown large piece which are displayed successively in the order named from the left in the first lowermost row, a gray large piece, a gray large piece, a brown large piece, and a white large piece which are displayed successively in the order named from the left in the first second row, and a white large piece which is displayed in the third row. A gray large piece which is given as an exchange piece to the game player is held as a piece in reserve by a cursor for movement therewith, and is displayed in overlapping relation to the brown large piece in the second row, for example. The cursor is shaped as a double-winged ring. The gray large piece held by the cursor can be moved vertically and horizontally in the field when the game player operates the lever 22L of the controller 22.

When the game player positions the cursor over the brown large piece in the second row and then presses the first button 22c of the controller 22, the gray large piece held by the cursor and the brown large piece in the second row are exchanged, as shown in FIG. 5. This exchange puts three horizontally connected gray large pieces in the second row, which are removed from the field, as shown in FIG. 6. When these three horizontally connected gray large pieces in the second row are removed from the field, an image is displayed in their place which shows as if these gray large pieces were exploded away.

Then, as shown in FIG. 7, when the game player exchanges the brown large piece held by the cursor for the yellow large piece, second to the right, in the first row, three brown pieces are horizontally connected in the first row, as shown in FIG. 8. Therefore, as shown in FIG. 9, these three brown pieces which are horizontally connected in the first row are removed from the field. At this time, an image is displayed in their place which shows as if these brown large pieces were exploded away. After the brown large pieces in the first row are removed, the white large piece in the second row drops into the first row, making up three horizontally connected white large pieces in the first row, as shown in FIG. 10. Therefore, these horizontally connected white large pieces in the first row are removed from the field, as if exploded away as indicated by an image displayed in their place, as shown in FIG. 11. Now, as shown in FIG. 12, one yellow large piece remains in the first row, and one white large piece remains in the second row, with a yellow piece held by the cursor.

An example of large and small pieces present in the field will be described below with reference to FIGS. 13 through 15. As shown in FIG. 13, the field contains a white small piece, a white small piece, a white small piece, a yellow small piece, a yellow large piece, and a brown small piece which are displayed successively in the order named from the left in the first lowermost row, a gray small piece, a gray small piece, a gray small piece, a yellow small piece, a brown small piece, and a gray large piece which are displayed successively in the order named from the left in the first second row, a yellow small piece, a brown small piece, and a white large piece which are displayed successively in the order named from the left in the third second row, a yellow small piece, a brown small piece, and a white large piece which are displayed successively in the order named from the left in the fourth second row, and a brown small piece, a white large piece, and a gray large piece which are displayed successively in the order named from the left in the fifth second row. A yellow small piece which is given as an exchange piece to the game player is held as a piece in reserve by a cursor for movement therewith, and is displayed in overlapping relation to the gray small piece in the fifth row, for example. The cursor is shaped as a double-winged lozenge. The yellow small piece held by the cursor can be moved vertically and horizontally in the field when the game player operates the lever 22L of the controller 22.

When the game player positions the cursor over the brown small piece in the fifth row and then presses the first button 22c of the controller 22, the yellow small piece held by the cursor and the brown small piece in the fifth row are exchanged, as shown in FIG. 14. Then, the game player exchanges the brown small piece held by the cursor for the white large piece in the fifth row, and thereafter the game player positions the white large piece held by the cursor over the gray large piece in the fifth row, as shown in FIG. 15. When the game player presses the first button 22c of the controller 22, the white large piece held by the cursor and the gray large piece in the fifth row are exchanged. Therefore, as shown in FIG. 15, three vertically connected white large pieces are arranged across the third, fourth, and firth rows, and removed from the field.

Any small pieces positioned contiguous to large pieces that have been removed are converted to large pieces of the same colors as those small pieces. Therefore, since the three vertically connected white large pieces have been removed, the brown small pieces in the third, fourth, and firth rows which are contiguous to those three vertically connected white large pieces are converted to brown large pieces, respectively. These brown large pieces are thus removed from the field. Similarly, the yellow small pieces in the third, fourth, and firth rows which are contiguous to those three vertically connected brown large pieces are converted to yellow large pieces, respectively, which are then removed from the field.

FIGS. 16 through 20 show a control sequence according to a main routine of a video game program which controls the video game system shown in FIG. 1.

Figure 16:
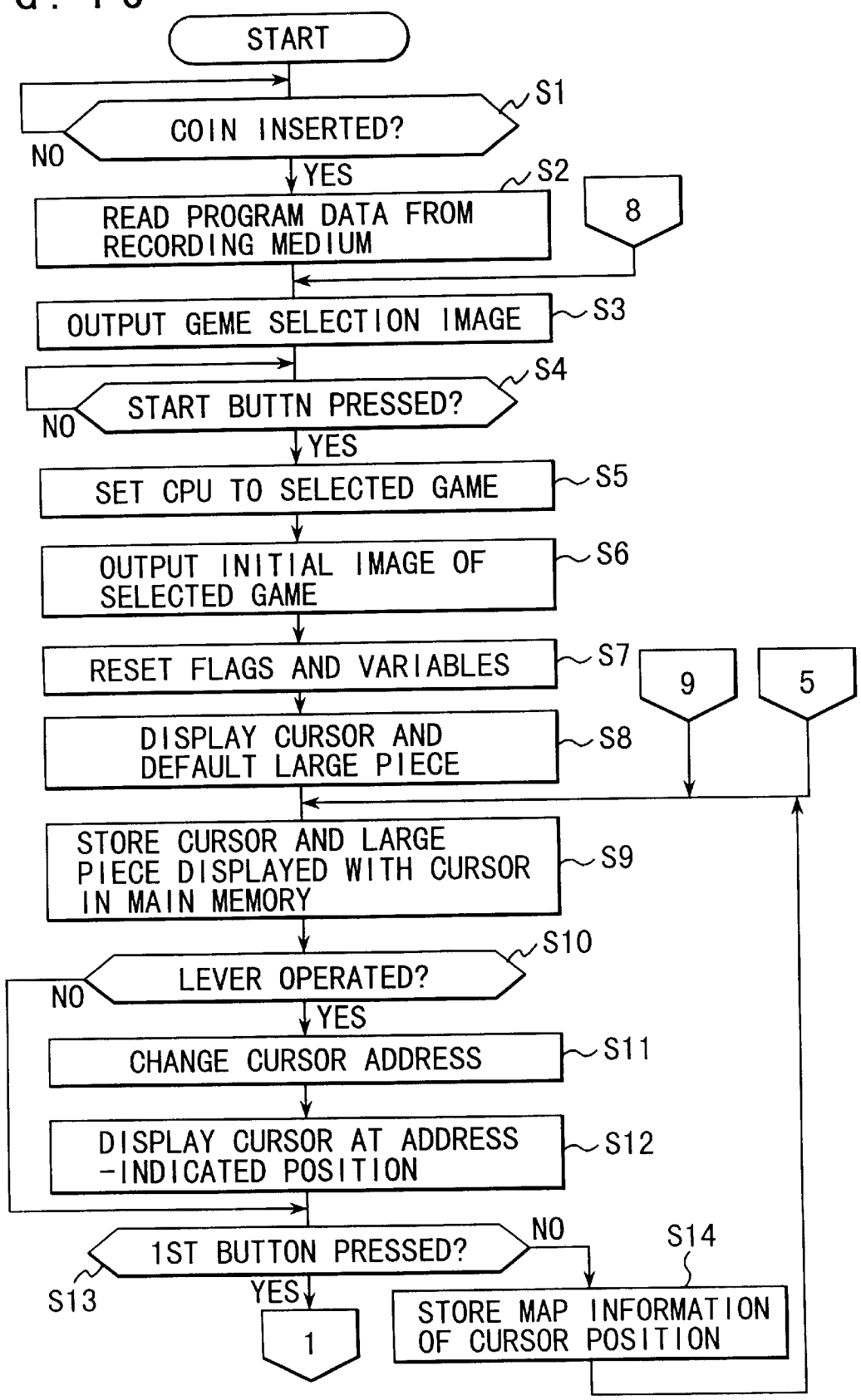
FIGS. 16 through 20 are flowcharts of a control sequence according to a main routine of a video game program which controls the video game system shown in FIG. 1.

The control sequence shown in FIG. 16 includes a step S1 which is executed by the operating system stored in the ROM 6 shown in FIG. 1, and other steps which are executed based on the game program data read from the recording medium 30. The steps based on the game program data are executed by the various functions or means of the CPU 1 as shown in FIG. 2.

In a step S1, the CPU 1 determines whether a coin is inserted into the coin insertion slot 22g or not. If a coin is inserted into the coin insertion slot 22g (YES), then control goes from the step S1 to a step S2.

The operating system instructs the recording medium driver 19 to read graphic data, audio data, and game program data from the recording medium 30 in a step S2. Of the data read from the recording medium 30, the game program data are stored in the main memory 5, and impart the functions or means shown in FIG. 2 to the CPU 1. The graphic data are stored in the non-display area of the buffer 11 connected to the graphic processor 10. The audio data are stored in the buffer 14 connected to the audio processor 13.

In the step S3, the graphic command issuing means 1g issues a graphic command for displaying a game selection image to the graphic processor 10. Based on the supplied graphic command, the graphic processor 10 stores graphic data of the game selection image in the display area of the buffer 11 and displays the game selection image on the display screen of the television monitor 12.

In a step S4, the button operation detecting means 1a determines whether the start button 22a of the controller 22 has been pressed or not by the game player. If pressed (YES), then control proceeds to a step S5. Before the start button 22a is pressed by the game player, the game player selects a desired video game on the game selection image using the lever 22L. After the game player has selected a desired video game, the game player presses the start button 22a.

In a step S6, the graphic command issuing means 1g issues a graphic command for displaying an initial image of the selected game to the graphic processor 10. The graphic processor 10 stores graphic data of the initial image in the display area of the buffer 11 and displays the initial image on the display screen of the television monitor 12.

In a step S7, the variable setting means 1b resets flags and variables held in the main memory 5.

In a step S8, the register information managing means 1h registers storage address data, type data, and display address data of images of a cursor and a default large piece in a data register of the main memory 5. The storage address data, type data, and display address data will hereinafter referred to collectively as "image information." The image information registered in the data register is read by the register information managing means 1h in a next frame. The image information thus read is supplied to the graphic processor 10. Based on the supplied image information, the graphic processor 10 reads the image data from the non-display area of the buffer 11, and writes the image data into the display area of the buffer 11. The graphic processor 10 converts the image data written in the display area of the buffer 11 to an NTSC color television signal, for example, and then supplies the NTSC color television signal to the television monitor 12. The television monitor 12 now displays on the display screen the image of the cursor and the image of the default large piece.

As described above, the image of the cursor comprises a double-winged ring. The wings of the cursor are displayed in an animation mode such that they are flapped. Specifically, in the animation mode, several image data of different cursor wing shapes are made available, and alternately displayed in respective fields or frames to display the cursor as if its wings were flapped.

In a step S9, the CPU 1 stores the information of the cursor and the large piece displayed with the cursor in the main memory 5.

Then, in a step S10, the button operation detecting means 1a determines whether the lever 22L of the controller 22 has been operated or not by the game player. If operated (YES), then control proceeds to a step S11. If not (NO), then control jumps to a step S13.

In the step S11, the CPU 1 changes the values of the display address data, stored in the main memory 5, of the cursor and the large piece displayed therewith.

In a step S12, the register information managing means 1h writes the display address data, stored in the main memory 5, of the cursor and the large piece displayed therewith into corresponding data areas in the data register. The images of the cursor and the large piece which have been moved are now displayed on the display screen of the television monitor 12.

In the step S13, the button operation detecting means 1a determines whether the first button 22c of the controller 22 has been pressed or not by the game player. If pressed (YES), then control proceeds to a step S15. If not (NO), then control proceeds to a step S14. In this embodiment, if the cursor holds neither large piece nor small piece, then the button operation detecting means 1a does not decide that the first button 22c is pressed even when it is actually pressed by the game player.

In the step S14, the CPU 1 temporarily stores the information of the map of the field which corresponds to the position of the cursor, in the main memory 5.

In the step S15, the CPU 1 stores a display address (x, y) of the cursor and address data on the map of the position of the display address in a given area of the main memory 5.

In a next step S16, the piece type determining means 1f reads the type data from the main memory 5, and determines whether or not a piece type indicated by the type data is a large or small piece. If the piece type is a large or small piece (YES), then control goes to a step S17. If the piece type is not a large or small piece (NO), then control goes to a step S19.

In the step S17, the piece exchanging means 1g converts the image information in the data register which is indicated by the address of the cursor, to image information of the large piece which is moving with the cursor.

In a next step S18, the piece exchanging means 1g stores the address data of the cursor stored in the step S15 as image information of the large piece which is moving with the cursor, in the main memory 5. In the steps S17, S18, therefore, the image data of the large piece at the cursor in the field is replaced with the image data of the large piece which is moving with the cursor when the game player presses the first button 22a.

In the step S19, the piece exchanging means 1g stores image information of the large or small piece which is moving with the cursor, as image information on the map which is indicated by the address of the cursor, into a corresponding position in the data register.

In a step S100, the CPU 1 executes a drop subroutine.

In a step S200, the CPU 1 executes a removal subroutine.

In a step S20, the flag managing means 1e changes the value of a flag to a value of the opponent game player.

In a step S21, the attack piece information managing means 1k reads piece type data corresponding to the value of a removal count ERA from the table.

In a step S22, the attack piece information managing means 1k writes the piece type data read from the table as attack piece type data into the attack piece information area of the opponent game player.

In a step S23, the flag managing means 1e changes the value of the flag to a value of the game player.

In a step S24, the attack piece information managing means 1k reads the data stored in the attack piece information area of the game player.

In a step S25, the decision means 1c determines whether there is an attack piece from the opponent game player or not. If there is an attack piece from the opponent game player (YES), then control proceeds to a step S26. If not (NO), then control jumps to a step S31.

In the step S26, the register information managing means 1h obtains image information based on the attack piece type data stored in the attack piece information area, and registers the image information in the data register. The map information managing means 1i registers address data in the data register of the image information newly registered in the data register, on the map.

In a step S27, the attack piece information managing means 1k clears the attack piece information area of the game player.

In a step S28, the calculating means 1d subtracts "1" from a vertical maximum value Ymax on the map.

In a step S29, the map information managing means 1i reads positional information on the map which corresponds to a value Y, and supplies the positional information to the decision means 1c. The decision means 1c determines whether the information from the map information managing means 1i is "0" or not. If the information from the map information managing means 1i is "0" (YES), then control goes to a step S30. If not (NO), then control returns to the step S26.

In the step S30, the calculating means 1d sets the value Y to the vertical maximum value Ymax.

In the step S31, the calculating means 1d subtracts "1" from first timer data T1.

In a step S32, the decision means 1c determines whether the first timer data T1 is "0" or not. If the first timer data T1 is "0" (YES), then control proceeds to a step S33. If not (NO), then control goes back to the step S9.

In the step S33, the variable setting means 1b substitutes first default time data in the first timer data T1.

In a step S34, the calculating means 1d adds "a" to second timer data T2.

In a step S35, the decision means 1c determines whether the second timer data T2 is "16" or not. If the second timer data T1 is "16" (YES), then control proceeds to a step S36. If not (NO), then control goes back to the step S9.

In the step S36, the variable setting means 1b substitutes "0" in the second timer data T2.

Each of the steps S31~S36 is a timer data processing step. Specifically, each of the steps S31~S33 is a low-level timer data processing step, and each of the steps S34~S36 is a high-level timer data processing step. When a certain period of time is measured by these timer data processing steps, one row of pieces is added in the x direction to the field of the game player. Steps S37~S45 described below are processing steps for adding one row of pieces in the x direction to the field of the game player.

In a step S37, the variable setting means 1b substitutes "1" in a horizontal address x and "13" in a vertical address y in order to start adding one row of pieces from the bottom or lowermost row of the map shown in FIG. 3C or 3E. An address (1, 13) in the map shown in FIG. 3C or 3E represents a position at the top or uppermost row, i.e., a left position at the top of the map.

In a step S38, the map information managing means 1i determines whether there is a piece by determining whether address data is written in a position on the map which is represented by the address (x, y). If there is a piece (YES), then control goes to a step S39. If not (NO) then control jumps to a step S42. The address data referred to in the step S38 is represented by "ad" in FIGS. 3A, 3C, and 3E.

In the step S39, the calculating means 1d adds "1" to an uppermost row piece count NUM.

In a step S40, the map information managing means 1i erases the address data of the piece on the map, which has been detected in the step S38.

In a step S41, register information managing means 1h erases image information in the data register that is indicated by the address data of the piece on the map, which has been detected in the step S38. The uppermost row piece count NUM represents the number of pieces present in the uppermost row of the map shown in FIG. 3C or 3E. In this embodiment, when pieces reach the uppermost row of the map shown in FIG. 3C or 3E, the game player belonging to the map loses the video game. Therefore, when uppermost row piece count NUM is "1" or more, the game player belonging to the map loses the video game. Alternatively, a hypothetical row (1, 14) which is not displayed on the display screen may be employed, and the game player may be judged as losing the video game when pieces reach that hypothetical row.

In the step S42, the calculating means 1d adds "1" to the horizontal address x.

In a step S43, the decision means 1c determines whether the value of the horizontal address x is larger than "6" or not. If the value of the horizontal address x is larger than "6" (YES), then control proceeds to a step S44. If not (NO), then control goes back to the step S38. The steps S37~S43 serve to detect whether pieces have reached the uppermost row of the map or not.

In the step S44, the variable setting means 1b substitutes "1" in the horizontal address x and "12" in the vertical address y.

In a step S45, the map information managing means 1i determines whether there is a piece by determining whether the address data "ad" (see FIGS. 3A, 3C, 3E) is written in a position on the map which is represented by the address (x, y). If there is a piece (YES), then control goes to a step S46. If not (NO) then control jumps to a step S48.

In the step S46, the map information managing means 1i changes the address data "ad" from the position on the map which is represented by the address (x, y) to a position on the map which is represented by an address (x, y+1). The step S46 serves to move the piece from a lower address to an upper address, displaying the piece as moving upwardly.

In a step S47, the register information managing means 1h increments by "1" the value in the y direction of the display address data of the image data in the data register (see FIG. 3A) which is represented by the address data "ad" in the position on the map which is represented by an address (x, y+1).

In the step S48, the calculating means 1d adds "1" to the horizontal address x.

In a step S49, the decision means 1c determines whether the value of the horizontal address x is larger than "6" or not. If the value of the horizontal address x is larger than "6" (YES), then control proceeds to a step S50. If not (NO), then control goes back to the step S45. As can be understood from the above description, the steps S45~S49 serve to move all pieces in a horizontal row where the value y is fixed, upwardly by one row.

In the step S50, the variable setting means 1b substitutes "1" in the horizontal address x.

In a step S51, the calculating means 1d subtracts "1" from the vertical address y.

In a step S52, the decision means 1c determines whether the value of the vertical address y is "0" or not. If the value of the vertical address y is "0" (YES), then control proceeds to a step S53. If not (NO), then control goes back to the step S45. The steps S50~S52 serve to shift the processing upwardly by one row on the map.

In the step S53, the decision means 1c determines whether the value of the uppermost row piece count NUM is "0" or not. If the value of the uppermost row piece count NUM is "0" (YES), then control goes back to the step S9. If not (NO), then control proceeds to a step S54. The step S53 serves to determine whether there is a piece in the uppermost row on the map or not for thereby determining whether the game player has lost the video game or not.

In the step S54, the result information outputting means 1n supplies a command for outputting information indicating that the game player has lost the video game, to the graphic processor 10. Based on the supplied information, the graphic processor 10 loads image data indicating that the game player has lost the video game into the display area of the buffer 1. Therefore, the display screen of the television monitor 12 displays an image representing that the game player has lost the video game.

In a step S55, the button operation detecting means 1a determines whether any button on the controller 22 has been pressed or not by the game player. If pressed (YES), then control goes to a step S56.

In the step S56, the variable setting means 1b initializes all parameters.

Figure 17:
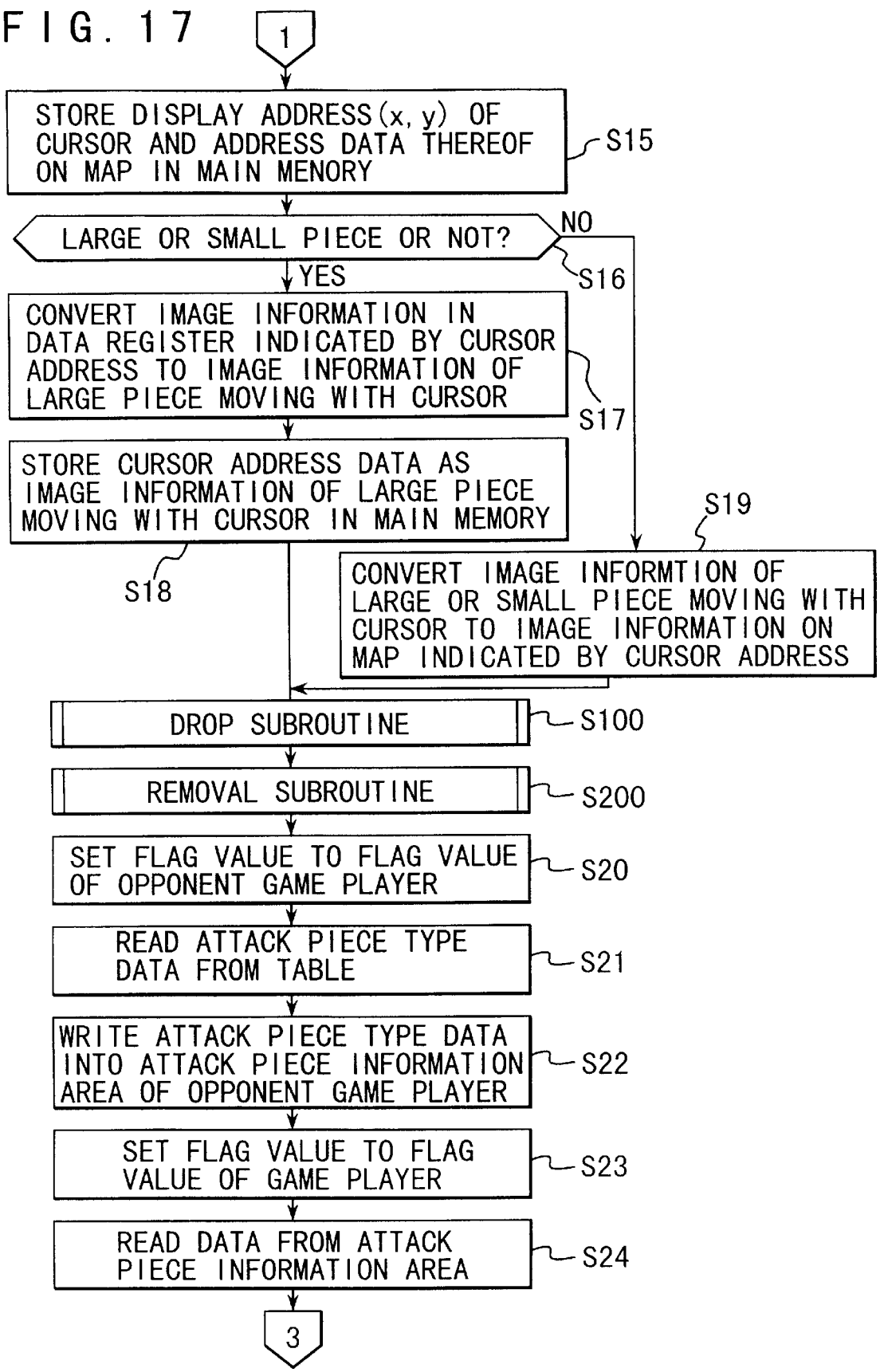
Figure 18:
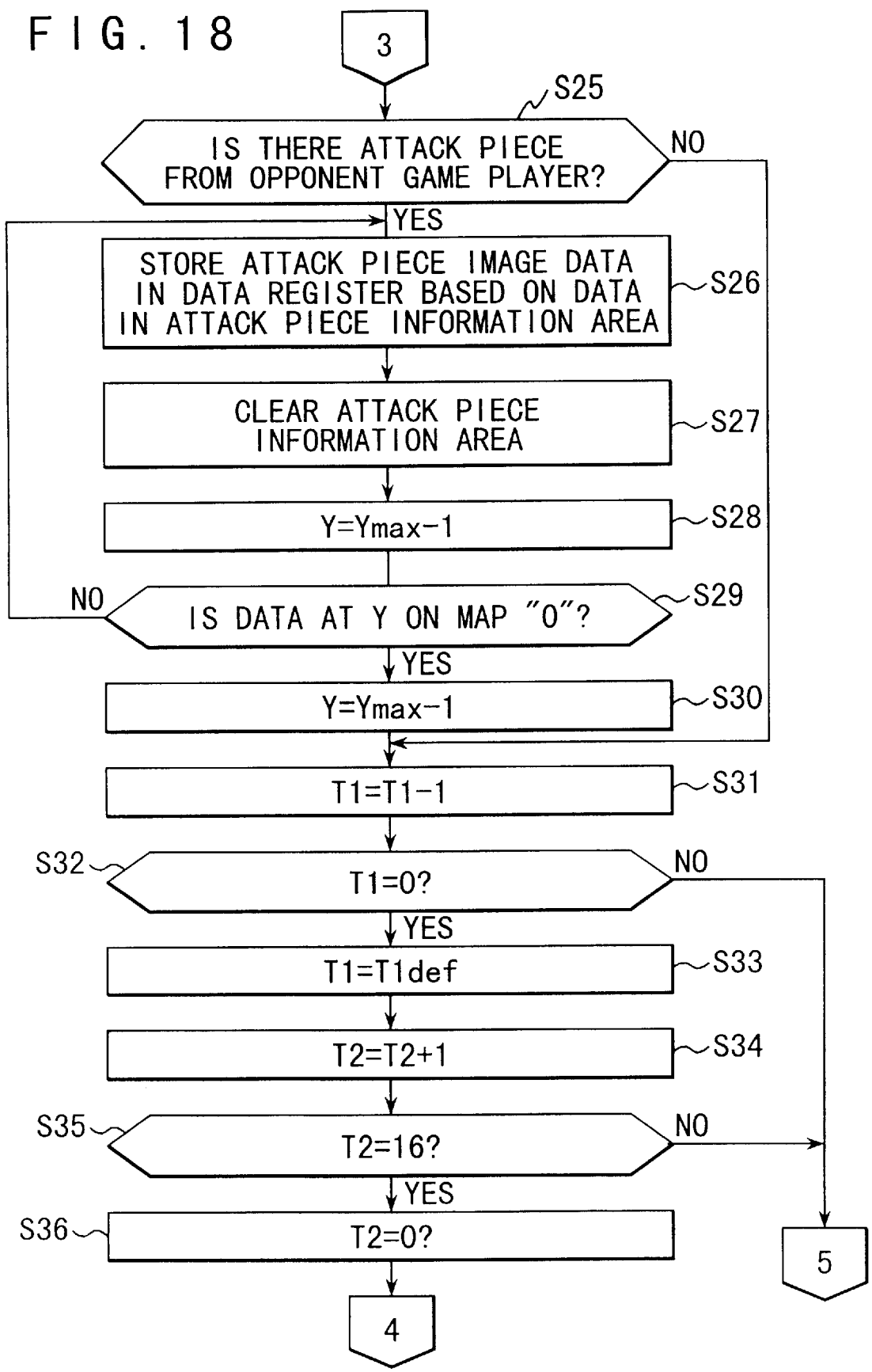
Figure 19:
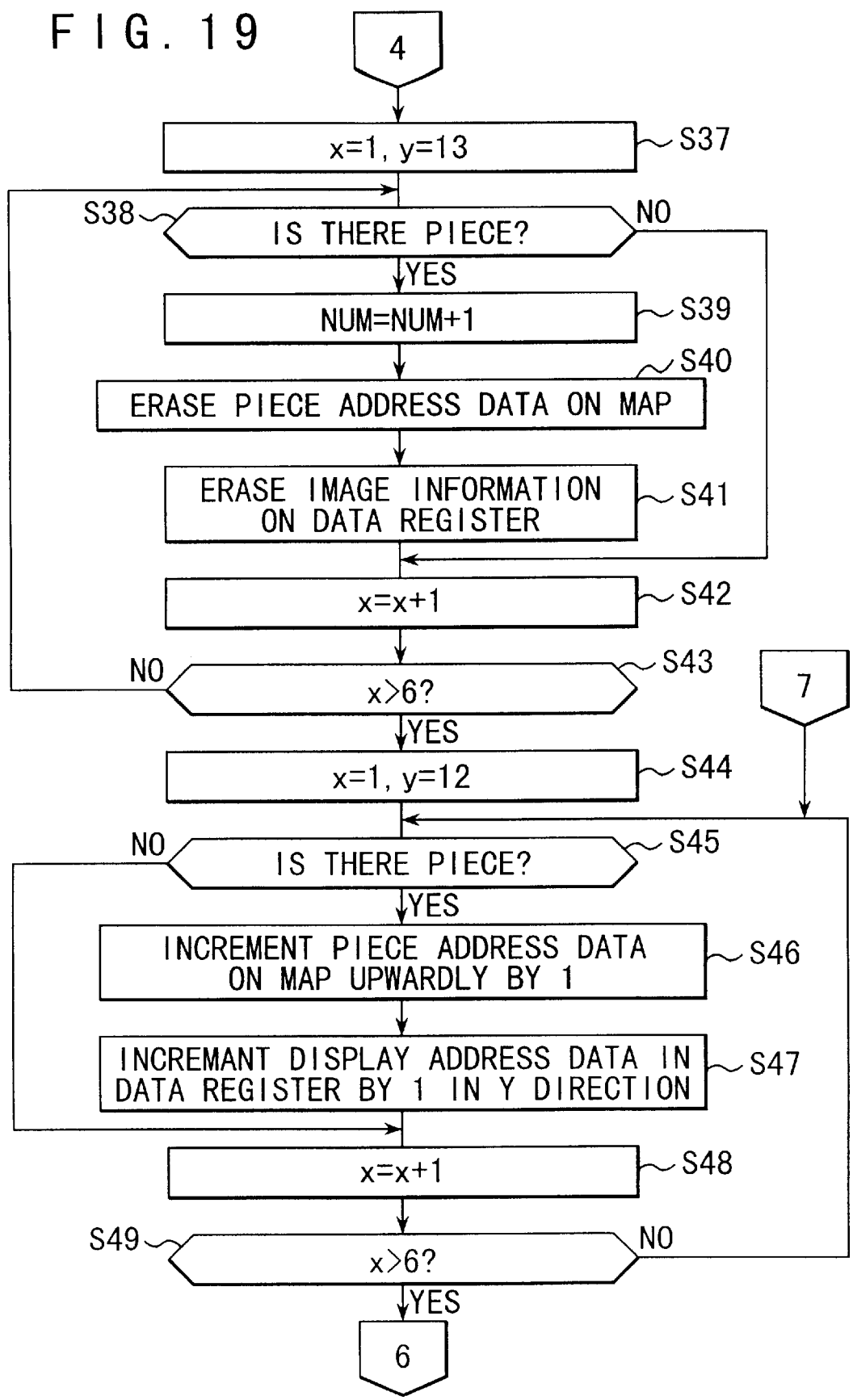
Figure 21:
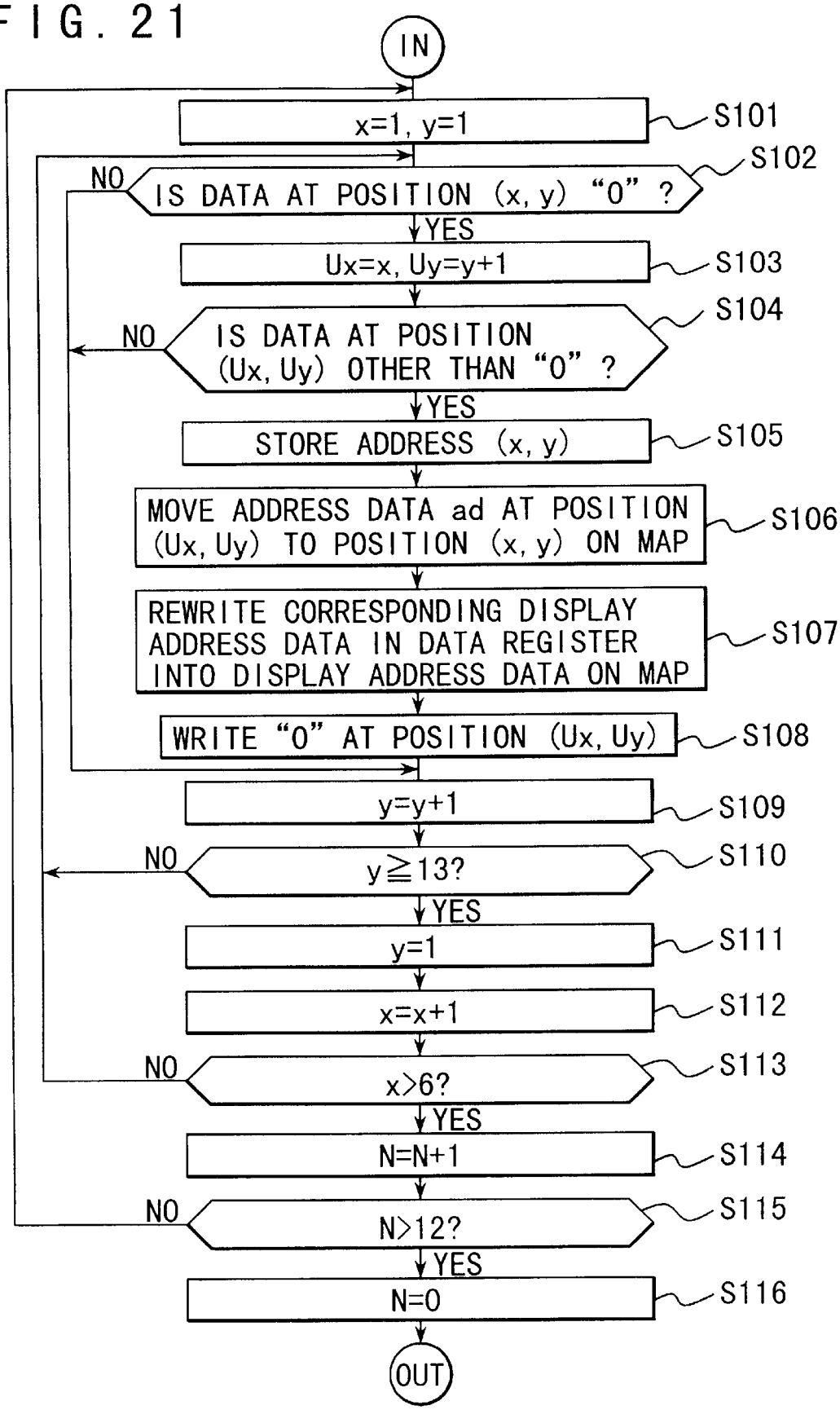
FIG. 21 is a flowchart of a control sequence according to a drop subroutine included in the main routine
Figure 22:
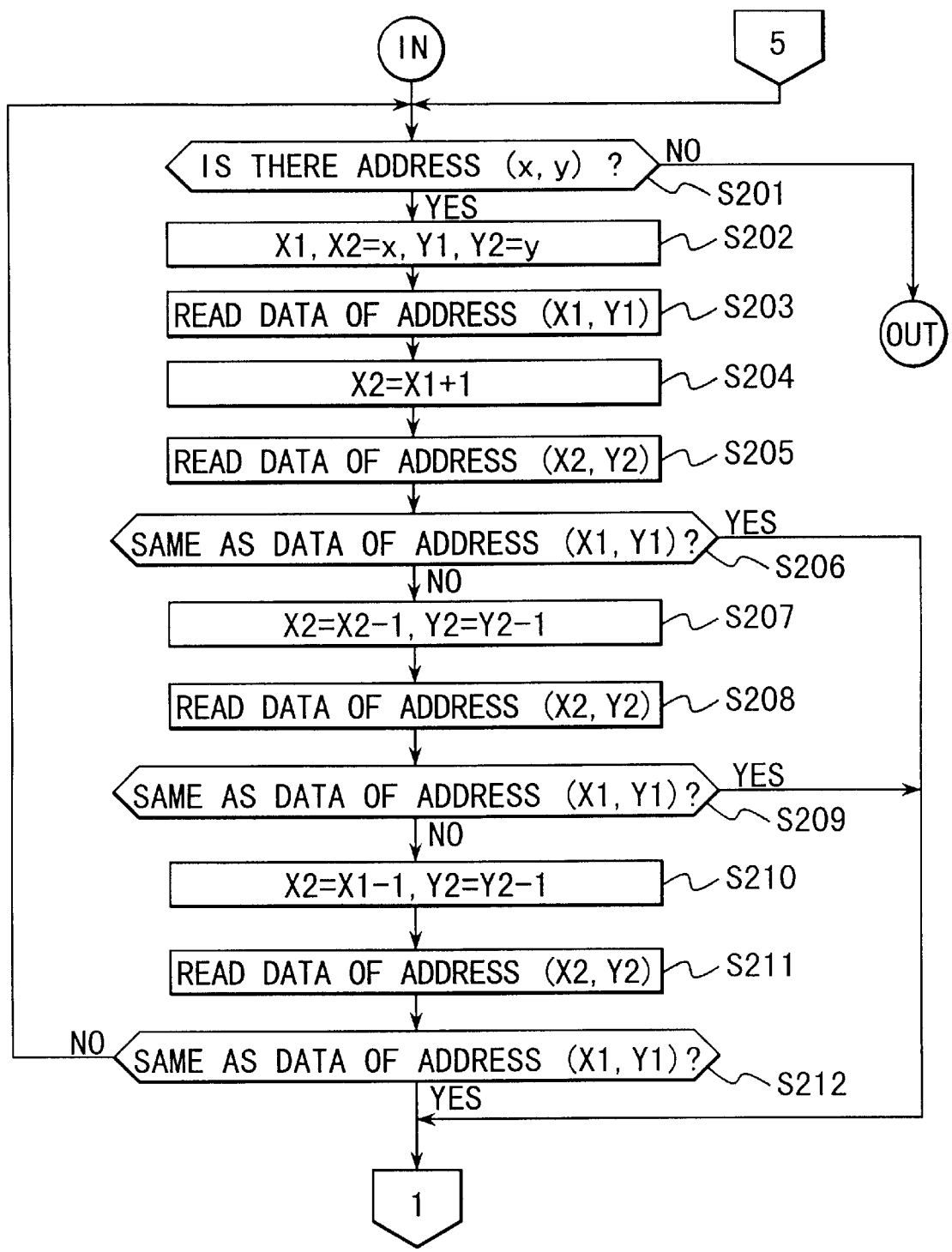
FIGS. 22 through 25 are a flowchart of a control sequence according to a removal subroutine included in the main routine.
Figure 23:
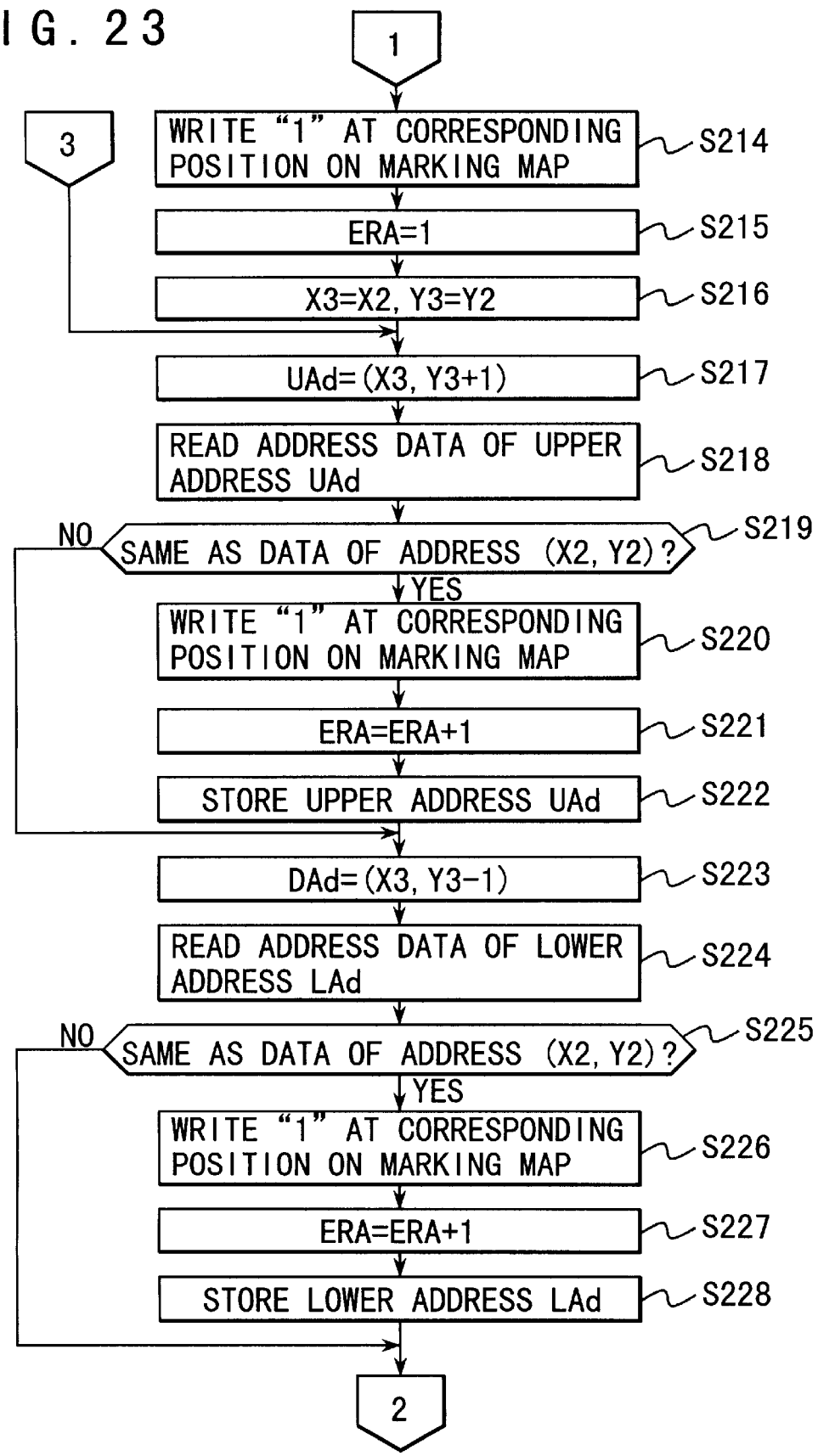
Figure 24:
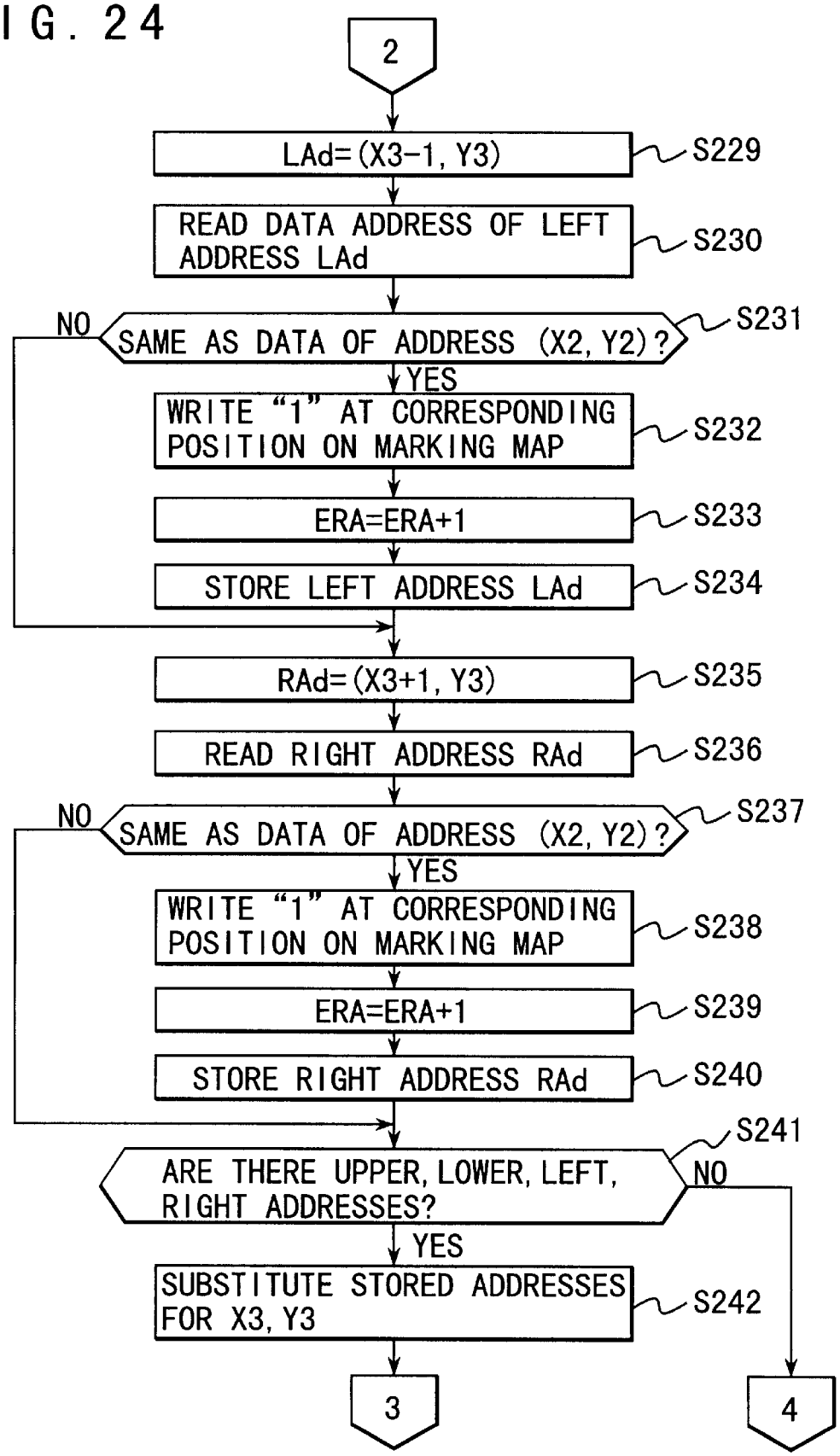
Figure 25:
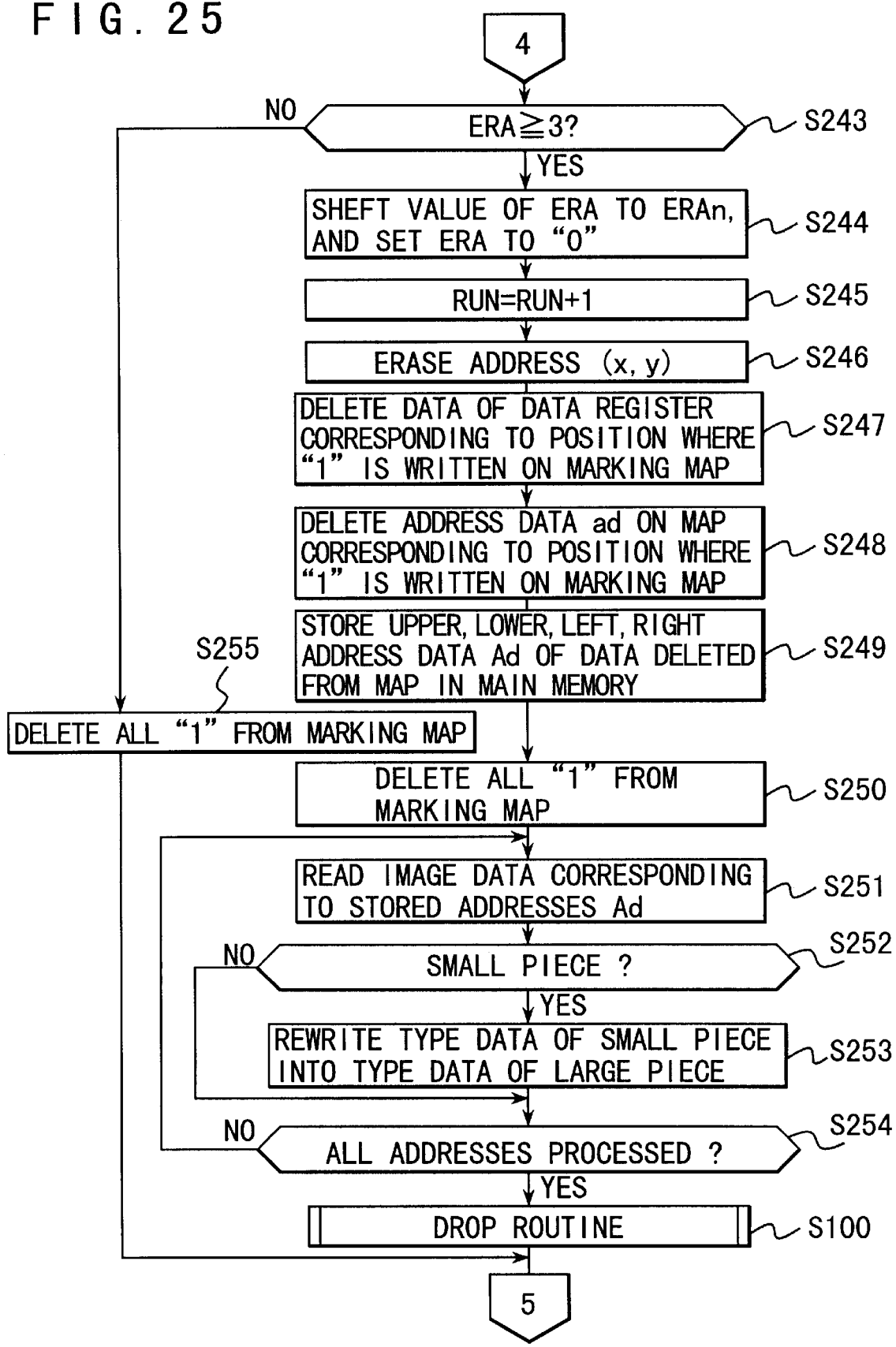

FIG. 21 shows in detail the drop subroutine S100 shown in FIG. 17.

In a step S101, the variable setting means 1b substitutes "1" in the horizontal address x and "1" in the vertical address y.

In a step S102, the decision means 1c determines whether the data at the position (x, y) on the map shown in FIGS. 3C or 3E is "0" or not. If the data at the position (x, y) is "0" (YES), then control goes to a step S103. If not (NO), then control jumps to a step S109.

In the step S103, the variable setting means 1b substitutes the value of the horizontal address x in a variable Ux and the value of the vertical address (y+1) in a variable Uy.

In a step S104, the decision means 1c determines whether the data at the position (Ux, Uy) on the map is other than "0" or not. If the data at the position (Ux, Uy) is other than "0" (YES), then control goes to a step S105. If not (NO), then control jumps to the step S109. The step S104 serves to determine whether there is a piece directly below the address (Ux, Uy), i.e., (x, y+1) on the map, or not.

In the step S105, the map information managing means 1i stores the address data (x, y). The address (x, y) which is first stored in this step is the vertical address y whose value is maximum.

In a step S106, the map information managing means 1i moves the address data ad in the position on the map which is represented by (Ux, Uy) to a position on the map which is represented by (x, y). The step S106 serves to drop the piece on the map.

In a step S107, the display address data of the image information in the data register which is indicated by the address data ad in the position on the map which is represented by (Ux, Uy) is rewritten by the display address data corresponding to (x, y) on the map. This step S107 serves to drop the piece in the data register. Since the display address in the data register is rewritten by the display address which is immediately therebelow on the display screen, the piece is visually dropped on the display screen.

In a step S108, the map information managing means 1i writes "0" in the position on the map which is indicated by (Ux, Uy) because the piece at the address (Ux, Uy) has dropped.

In the step S109, the calculating means 1d adds "1" to the vertical address y.

In a step S110, the decision means 1c determines whether or not the value of the vertical address y is equal to or greater than "13." If the value of the vertical address y is equal to or greater than "13" (YES), then control proceeds to a step S111. If not (NOT), then control goes back to the step S102.

In the step S111, the variable setting means 1b substitutes "1" in the vertical address y.

In a step S112, the calculating means 1d adds "1" to the horizontal address x.

In a step S113, the decision means 1c determines whether the value of the horizontal address x is greater than "6", or not. If the value of the horizontal address x is greater than "6" (YES) then control proceeds to a step S114. If not (NOT), then control goes back to the step S102.

In the step S114, the calculating means 1d adds "1" to N.

In a step S115, the decision means 1c determines whether N exceeds "12" or not. If N exceeds "12" (YES), then control goes to a step S116. If not (NO), then control returns to the step S101.

In the step S116, the calculating means 1d sets N to "0." Thereafter, control leaves the drop subroutine.

The decision means 1c determines whether N exceeds "12" or not in the step S115 because the piece is moved one storage area (see FIGS. 3C and 3E) in the vertical direction in each loop from the step S101 to the step S113. Since there are 13 storage areas in the vertical direction in each of locations in the horizontal direction, all pieces can moved by repeating the above loop 12 times. For example, the loop may be executed 12 time in order to move a piece from a highest address (x, 13) (x=1, 2, 3, . . . , 6) in the vertical direction to an address (x, 1) (x=1, 2, 3, ..., 6). In this manner, all the areas of the maps shown in FIGS. 3C and 3E are searched upwardly for the drop subroutine.

FIGS. 22 through 25 show in detail the removal subroutine S200 shown in FIG. 17.

In a step S201, the decision means 1c determines whether there is an address (x, y) in a predetermined area in the main memory 5 or not. If there is an address (x, y) in a given area in the main memory 5 (YES), then control proceeds to a step S202. If not (NO), then control leaves the removal subroutine S200. The predetermined area in the main memory 5 is an area extending from a certain address to another certain address. The predetermined area stores the address (x, y) of the cursor in the step S15, and stores the address (x, y) of a position to which a dropped piece has moved in the step S105.

In the step S202, the variable setting means 1b substitutes the value of the horizontal address x in horizontal addresses X1, X2 and also substitutes the value of the vertical address y in vertical addresses Y1, Y2.

In a step (203, the map in formation managing means 1i reads address data ad of a position on the map which is indicated by the address (X1, Y1). Then, the register information managing means 1h reads image information stored in a position indicated by the value of the above address data ad in the data register.

In a step S204, the calculating means 1d substitutes the sum of the horizontal address X1 and "1" in the horizontal address X1.

In a step S205, the map information managing means 1i reads address data ad of a position on the map which is indicated by the address (X2, Y2). Then, the register information managing means 1h reads image information stored in a position indicated by the value of the above address data ad in the data register.

In a step S206, the decision means 1c determines whether the image data read from the data register by the address data on the map which is indicated by the value of the address (X1, Y1) is the same as the image data read from the data register by the address data on the map which is indicated by the value of the address (X2, Y2) or not. If the compared image data are not the same as each other (NO), then control goes to a step S207. If not (NO), then control jumps to a step S214 (see FIG. 23). The step S206 serves to detect whether the same image data is present in a next right storage area. In this embodiment, it is assumed that if pieces that are horizontally adjacent to each other have the same information, then they are large pieces and have the same color as each other.

In the step S207, the calculating means 1d subtracts "1" from the horizontal address X2 and "1" from the vertical address Y2.

In a step S208, the map information managing means 1i reads address data ad of a position on the map which is indicated by the address (X2, Y2). Then, the register information managing means 1h reads image information stored in a position indicated by the value of the above address data ad in the data register.

In a step S209, the decision means 1c determines whether the image data read from the data register by the address data on the map which is indicated by the value of the address (X2, Y2) is the same as the image data read from the data register by the address data on the map which is indicated by the value of the address (X1, Y1) or not. If the compared image data are the same as each other (YES), then control jumps to the step S214. If not (NO), then control goes to a step S210. The step S209 serves to detect whether the same image data is present in a next lower storage area. In this embodiment, it is assumed that if pieces that are vertically adjacent to each other have the same information, then they are large pieces and have the same color as each other.

In the step 210, the calculating means 1d subtracts "1" from the horizontal address X2 and "1" from the vertical address Y2.

In a step S211, the map information managing means 1i reads address data ad of a position on the map which is indicated by the address (X2, Y2). Then, the register information managing means 1h reads image information stored in a position indicated by the value of the above address data ad in the data register.

In a step S212, the decision means 1c determines whether the image data read from the data register by the address data on the map which is indicated by the value of the address (X2, Y2) is the same as the image data read from the data register by the address data on the map which is indicated by the value of the address (X1, Y1) or not. If the compared image data are the same as each other (YES), then control goes to the step S214. If not (NO), then control goes back to the step S201. The step S212 serves to detect whether the same image data is present in a next left storage area.

In the step S214, the marking map information managing means 1j writes "1" in a corresponding position on the marking map. The information "1" represents a flag which indicates that the large piece in this corresponding position is of the same color of a large piece which has been used as a reference piece for comparison. The corresponding position may be two positions. One of the positions is a position on the marking map which corresponds to the position on the map which is indicated by the address (X2, Y2) where the information is registered that has been judged as being the same as the information indicated by the address (X1, Y1) in the step S206. The other position is a position on the marking map which corresponds to the position on the map which is indicated by the address (X2, Y2) where the information is registered that has been judged as being the same as the information indicated by the preceding address (X2, Y2) in the step S209. The flag "1" corresponding to the position on the marking map which corresponds to the position on the map indicated by the value of the address (X1, Y1) is written in steps S229 through S232.

In a step S215, the variable setting means 1b substitutes "1" in the removal count ERA.

In a step S216, the variable setting means 1b substitutes the value of the horizontal address X2 in a horizontal address X3 and the value of the vertical address Y2 in a vertical address Y3.

In a step S217, the variable setting means 1b sets an address (X3, Y3+1) in an upper address UAd.

In a step S218, the map information managing means 1i reads address data from a position on the map which is indicated by the upper address UAd. Then, the register information managing means 1h reads image data from the data register with the above address data.

In a step S219, the decision means 1c determines whether the image data read from the data register by the address data on the map which is indicated by the value of the upper address UAd is the same as the image data read from the data register by the address data on the map which is indicated by the value of the address (X2, Y2) or not. If the compared image data are the same as each other (YES), then control goes to a step S220. If not (NO), then control jumps to a step S223.

In the step S220, the marking map information managing means 1j writes "1" in a corresponding position on the marking map.

In a step S221, the calculating means 1d adds "1" to the removal count ERA.

In a step S222, the map information managing means 1i stores the upper address UAd in a predetermined area in the main memory 5.

In a step S223, the variable setting means 1b substitutes an address (X3, Y3−1) in a lower address DAd.

In a step S224, the map information managing means 1i reads address data from a position on the map which is indicated by the lower address DAd. Then, the register information managing means 1h reads image data from the data register with the above address data.

In a step S225, the decision means 1c determines whether the image data read from the data register by the address data on the map which is indicated by the value of the lower address DAd is the same as the image data read from the data register by the address data on the map which is indicated by the value of the address (X2, Y2) or not. If the compared image data are the same as each other (YES), then control goes to a step S226. If not (NO), then control jumps to a step S229 (see FIG. 24).

In the step S226, the marking map information managing means 1j writes "1" in a corresponding position on the marking map.

In a step S227, the calculating means 1d adds "1" to the removal count ERA.

In a step S228, the map information managing means 1i stores the lower address DAd in a predetermined area in the main memory 5.

In the step S229, the variable setting means 1b substitutes an address (X3−1, Y3) in a left address LAd.

In a step S230, the map information managing means 1i reads address data from a position on the map which is indicated by the left address LAd. Then, the register information managing means 1h reads image data from the data register with the above address data.

In a step S231, the decision means 1c determines whether the image data read from the data register by the address data on the map which is indicated by the value of the left address LAd is the same as the image data read from the data register by the address data on the map which is indicated by the value of the address (X2, Y2) or not. If the compared image data are the same as each other (YES), then control goes to a step S232. If not (NO), then control jumps to a step S235.

In the step S232, the marking map information managing means 1j writes "1" in a corresponding position on the marking map.

In a step S233, the calculating means 1d adds "1" to the removal count ERA.

In a step S234, the map information managing means 1i sets the value of the left address LAd in a predetermined area in the main memory 5.

In the step S235, the variable setting means 1b substitutes an address (X3+1, Y3) in a right address RAd.

In a step S236, the map information managing means 1i reads address data from a position on the map which is indicated by the right address RAd. Then, the register information managing means 1h reads image data from the data register with the above address data.

In a step S237, the decision means 1c determines whether the image data read from the data register by the address data on the map which is indicated by the value of the right address RAd is the same as the image data read from the data register by the address data on the map which is indicated by the value of the address (X2, Y2) or not. If the compared image data are the same as each other (YES), then control goes to a step S238. If not (NO), then control jumps to a step S241.

In the step S238, the marking map information managing means 1j writes "1" in a corresponding position on the marking map.

In a step S239, the calculating means 1d adds "1" to the removal count ERA.

In a step S240, the map information managing means 1i sets the value of the right address RAd in a predetermined area in the main memory 5.

In the step S241, the decision means 1c determines whether there are stored addresses or not. If there are stored addresses (YES), then control proceeds to a step S242. If not (NO), then control jumps to a step S243 (see FIG. 25). The stored addresses are initially the upper, lower, left, and right addresses UAd, DAd, LAd, RAd with respect to the address (X2, Y2). The upper, lower, left, and right addresses UAd, DAd, LAd, RAd are successively substituted and processed. Subsequently, upper, lower, left, and right addresses which are similarly detected from these addresses are substituted and processed. The steps S217~S241 are repeated with respect to one type of pieces until all these addresses are searched in the upward, downward, leftward, and rightward directions. When the steps S217~S240 are carried out again, if the type of a piece on the data register which corresponds to the position indicated by the address ad on the map is the same as the type of a piece which has been processed in the steps S217~S240, then the corresponding position on the marking map is marked with "1."

In the step S242, the variable setting means 1b substitutes stored addresses in the address (X3, Y3). The stored addresses are the upper, lower, left, and right addresses UAd, DAd, LAd, RAd with respect to the address (X2, Y2).

In the step S243, the decision means 1c determines whether or not the value of the removal count ERA is "3" or greater. If the value of the removal count ERA is "3" or greater (YES), then control proceeds to a step S244. If not (NO), then control goes to a step S255.

In the step S244, the variable setting means 1b transfers the value of the removal count ERA to ERAn (n=1, 2, 3, . . . ), and sets the removal count ERA to "0."

In a step S245, the calculating means 1d adds "1" to a chain count RUN.

In a step S246, the variable setting means 1b deletes the data in all addresses (x, y) in the main memory 5. This is because after this process, the drop subroutine is carried out, and it is necessary to obtain new addresses (x, y) and old addresses (x, y) are not required.

In a step S247, the register information managing means 1h deletes image information, i.e., a storage address, a type, and a display address, registered in a position in the data register which is indicated by the address data ad registered in a position on the map which corresponds to a position where "1" is registered on the marking map.

In a step S248, the map information managing means 1i deletes address data ad in a position on the map which corresponds to the position where "1" is registered on the marking map.

In a step S249, the map information managing means 1i writes upper, lower, left, and right address data ad in the position on the map where the information has been deleted, in a predetermined area in the main memory 5.

In a step S250, the marking map information managing means 1j deletes all "1" from the making map.

In a step S251, the register information managing means 1h reads image information in the data register which is indicated by address data registered in the upper, lower, left, and right positions on the map where the information has been deleted, stored in the predetermined area in the main memory 5.

In a step S252, the decision means 1c determines whether pieces in the upper, lower, left, and right positions on the map where the information has been deleted are small pieces or not based on the type data contained in the image information. If the pieces are small pieces, YES), then control goes to a step S253. If not (NO), then control jumps to a step S254.

In the step S253, the register information managing means 1h rewrites the type data indicative of small pieces with type data indicative of large pieces.

In the step S254, the decision means 1c determines whether all the addresses stored in the predetermined area in the main memory 5 have been processed or not. If all the addresses have been processed (YES), then control goes to the step S100 again. If not (NO), then control goes back to the step S251.

The addresses referred to above are addresses stored in the predetermined area in the main memory 5, and signify upper, lower, left, and right addresses on the map where the information has been deleted.

The video game system according to the first embodiment of the present invention offers the following features and advantages:

While large and small pieces are successively moving upwardly into the field, the game player operates the controller 22 to exchange the piece indicated by the cursor for another piece in the piece. When three large pieces of the same color are connected, these large pieces are removed from the field. when a large piece is moved due to the removal of large pieces, it is detected whet her there are large piece s of the same color which are connected to the moved large piece or not. If three large pieces are connected as a result, then these large pieces are then removed from the field.

If there is a small piece contiguous to the large pieces which have been removed from the field, then the small piece is converted to a large piece, and it is whether there are large pieces of the same color which are connected to the large piece converted from the small piece. If three large pieces are connected as a result, then these large pieces are then removed from the field.

Consequently, the video game played on the video game system is basically different from conventional video games in which pieces that appear at the top of the display screen successively drop. The video game played on the video game system is in a new and different category for game players.

Pieces in the field may be exchanged in three different patterns. According to an exchange pattern (1), an exchange takes place between a piece held by the cursor and a piece present in the field. According to an exchange pattern (2), an exchange takes place between a piece held by the cursor and a piece-free state in the field. According to an exchange pattern (3), after the exchange pattern (2), a piece in the field is selected and held by the cursor for a subsequent exchange.

These exchange patterns are processed by the control sequence described above.

Modification 1:

In the above embodiment, when three pieces of the same type are connected, they are removed from the field. However, when six pieces, for example, of the same type or pieces in a certain pattern such as a full horizontal row are connected, they may be removed from the field. While the total number of pieces in the field is 6 (horizontal row)×13 (vertical row) in the illustrated embodiment, the total number of pieces in the field may be varied depending on the size of pieces used. In the illustrated embodiment, pieces are displayed two-dimensionally. However, they may be displayed three-dimensionally. Displaying pieces in a three-dimensional display mode can easily be achieved by fixing a viewpoint, mapping texture data of the pieces to polygons, and effecting light source calculations based on the positions of the pieces to change the luminance of the pieces. The three-dimensional display mode gives the pieces a visually pleasing appearance to provide a comfortable game space for the game player.

2nd Embodiment:

A video game system according to a second embodiment of the present invention will be described below.

The video game system according to the second embodiment has a game feature which gives the game players a graphical representation as to whether the game players can use their own pieces in reserve or not, in addition to the video game system according to the first embodiment.

Figure 26:
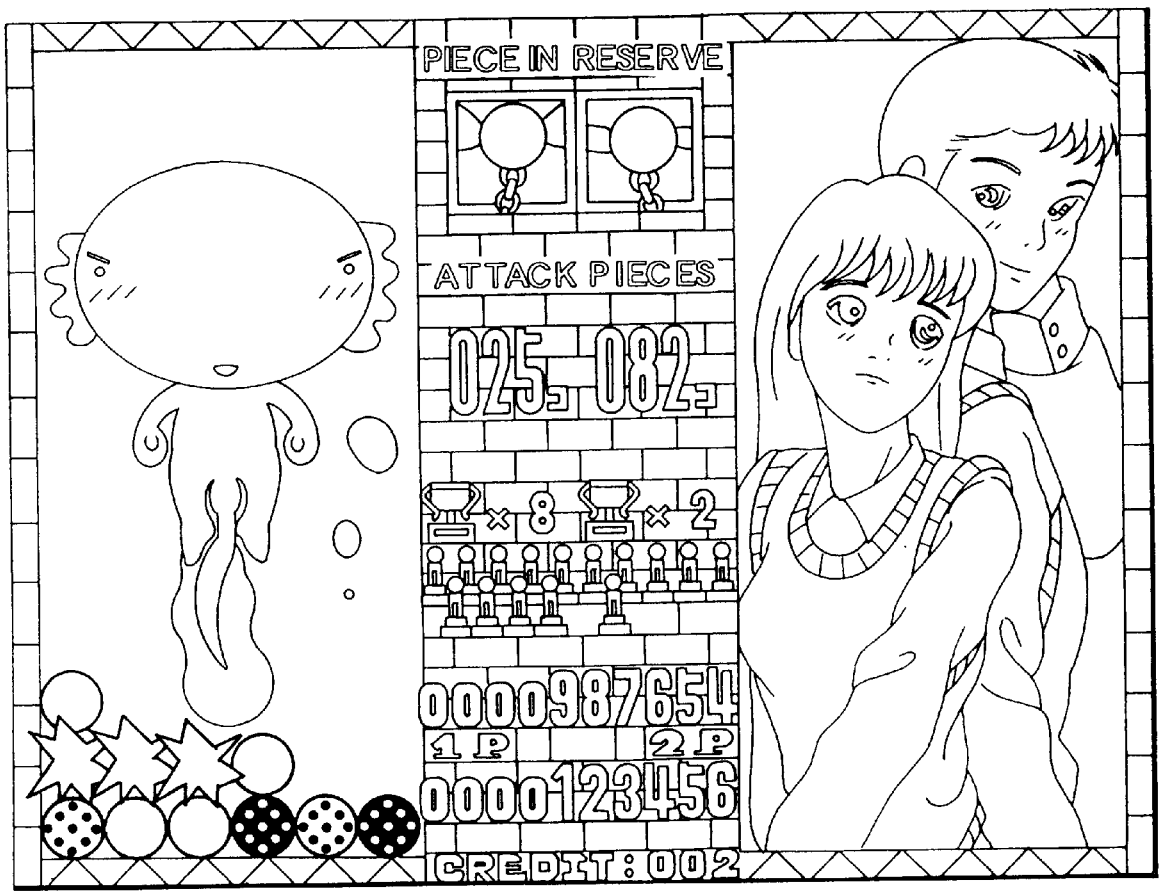
FIGS. 26 and 27 are views showing displayed images in a video game played on a video game system according to a second embodiment of the present invention.
Figure 27:
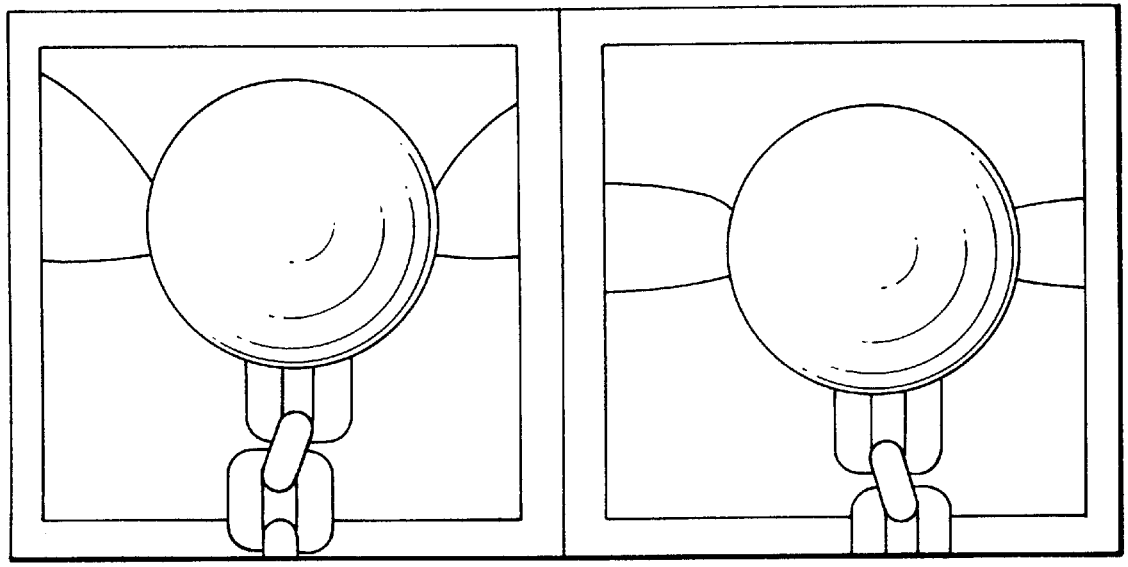

FIGS. 26 and 27 are views showing displayed images in a video game played on the video game system according to the second embodiment.

As shown in FIG. 26, if a condition for preventing the game players from using their own pieces in reserve is effective, then those pieces in reserve are displayed as being locked by respective chains. In FIG. 26, images of the pieces locked by respective chains are displayed in an upper central region of the display screen. In FIG. 27, the displayed images of the locked pieces are shown at an enlarge scale. As shown in FIG. 27, the upper central region of the display screen displays "PIECE IN RESERVE" in its upper area and pieces belonging respectively to the game player and the opponent game player, the pieces being locked by the chains. The condition for preventing the game players from using their own pieces in reserve is effective when large pieces are being removed from the field, as shown in FIG. 26, or the game player is being attached by the opponent game player. A piece in reserve can be used when no large piece is displayed, or a cursor and a large piece are not displayed or not locked by a chain.

The video game system according to the second embodiment of the present invention offers the following features and advantages:

In addition to the features and advantages of the video game system according to the first embodiment, the video game system according to the second embodiment can display graphic information which is easily visually recognizable as to whether pieces in reserve can be used or not. Therefore, the video game system according to the second embodiment provides a more comfortable game playing environment.

3rd Embodiment:

A video game system according to a third embodiment of the present invention will be described below.

The video game system according to the third embodiment has a detailed decision procedure for determining whether the game is to end or not, and prevents the game from ending if all pieces in the uppermost row are removed from the field before a predetermined period of time elapses from the time when the pieces are introduced into the uppermost row.

Figure 20:
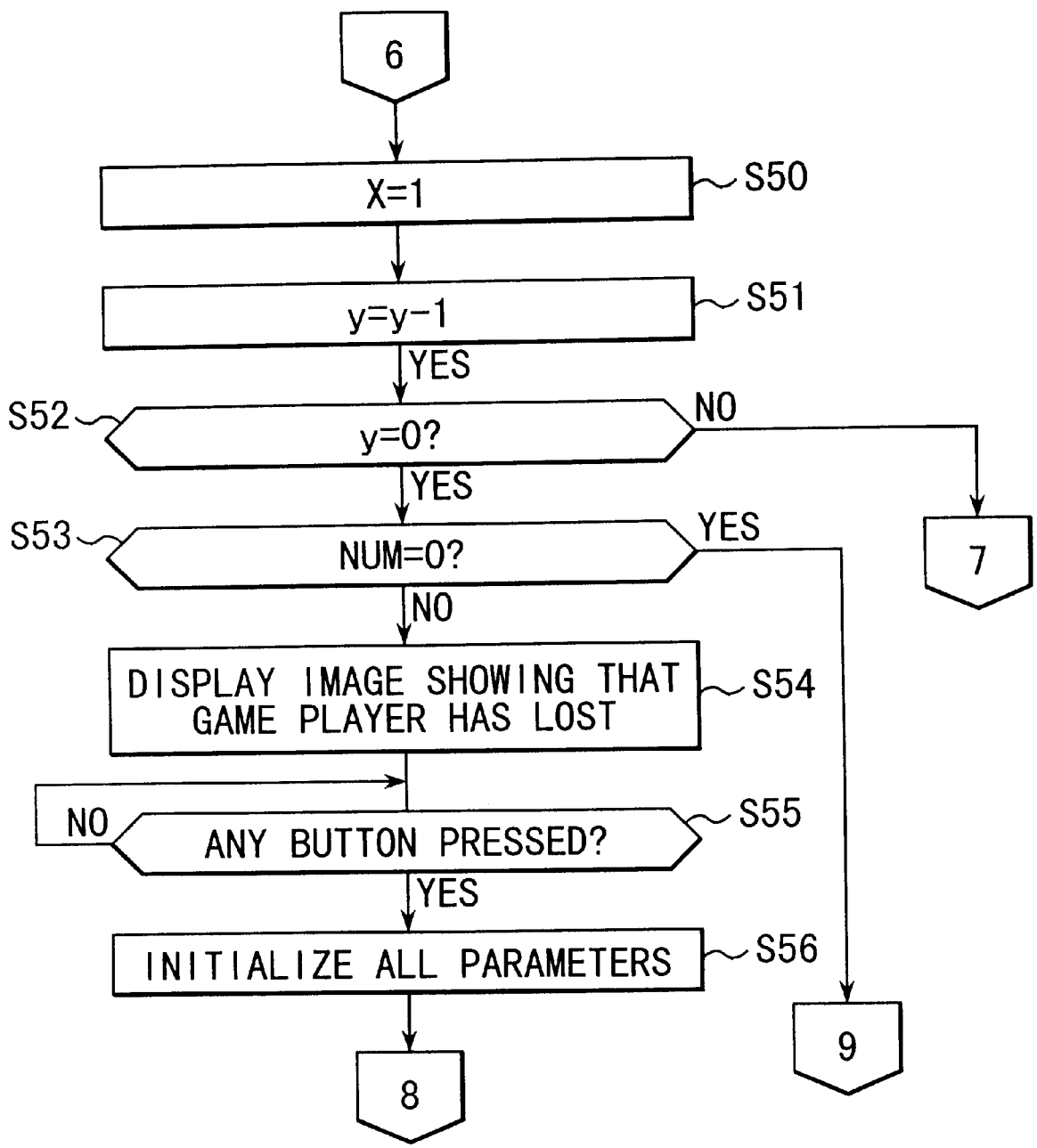
Figure 28:
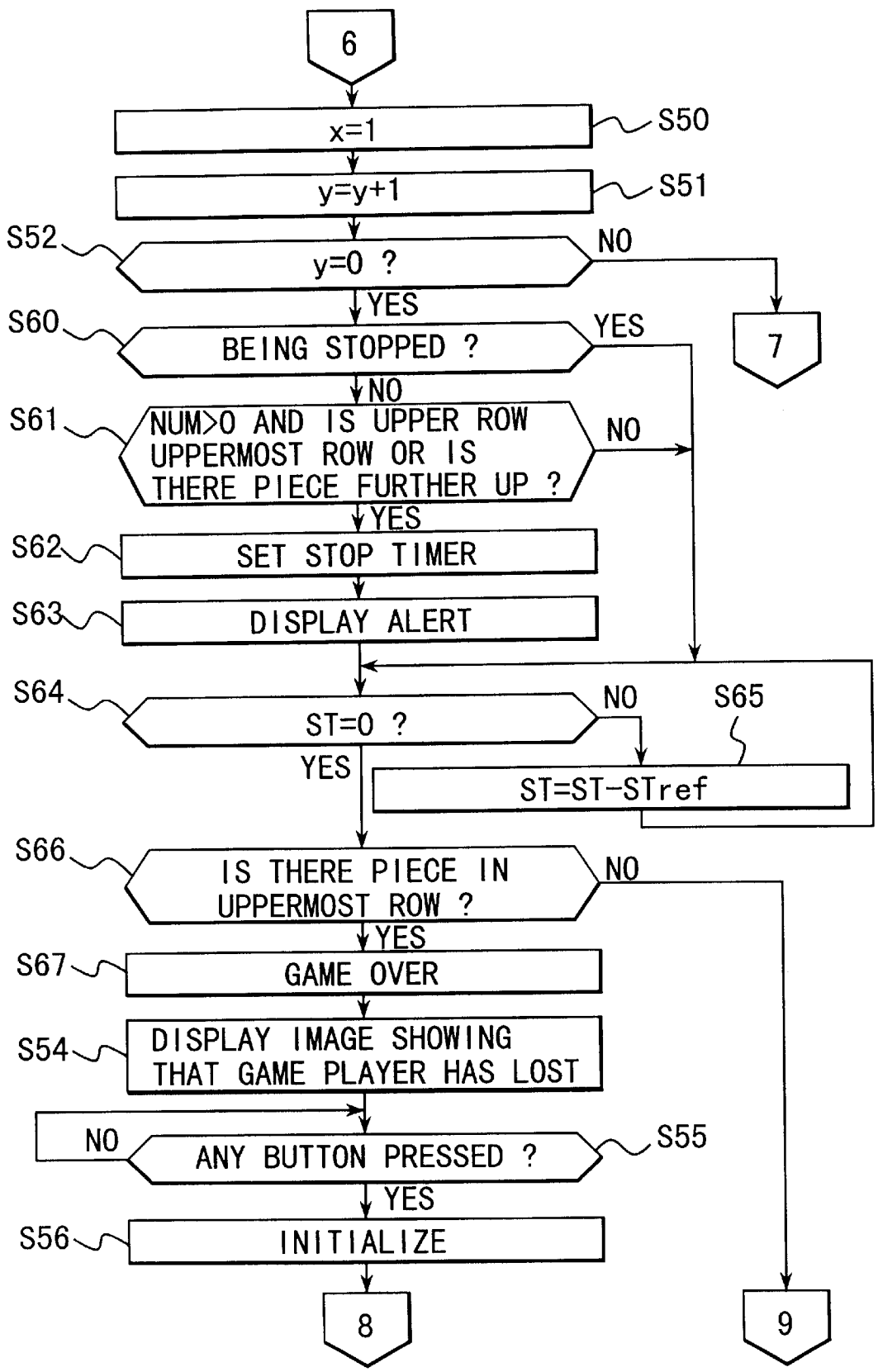
FIG. 28 is a flowchart of a control sequence section, used instead of the control sequence section shown in FIG. 20, of a main routine of a video game program executed by a video game system according to a third embodiment of the present invention.

FIG. 28 shows a control sequence section which is used according to the third embodiment instead of the control sequence section shown in FIG. 20 of the control sequence shown in FIGS. 16 through 20. According to the third embodiment, therefore, FIGS. 16 through 19 and FIG. 28 jointly make up a main routine executed by the video game system. Those steps shown in FIG. 28 which are identical to those shown in FIG. 20 are denoted by identical reference numerals, and will not be described in detail below. Those steps which are added according to the third embodiment are denoted by reference numerals of 60s. In the third embodiment, "timer means" and "alarm means" are used in addition to the other means which are shown in FIG. 2. If a control is branched from the step S52 to "NO," then control goes to the step S45 shown in FIG. 19.

As shown in FIG. 28, the decision means 1c determines in a step S60 whether the game is being stopped or not. If the game is being stopped (YES), then control jumps to a step S64. If not (NO), then control goes to a step S61. The step S60 is equivalent to the step S53 shown in FIG. 20.

In the step S61, the decision means 1c determines whether the value of the uppermost row piece count NUM is "0" or not and also whether or not an upper row is the uppermost row or there is a piece further up. If value of the uppermost row piece count NUM is "0" and an upper row is the uppermost row or there is a piece further up (YES), control proceeds to a step S62. If not (NO), control jumps to the step S64.

In the step S62, the timer means sets a stop timer.

In a step S63, the alarm means displays an alert which indicates that the game is about to end. The alarm means displays an alert by displaying the entire display screen in red.

In the step S64, the timer means determines whether a timer value ST is "0" or not. If the timer value ST is "0" (YES), then control goes to a step S66. If not (NO), then control goes to a step S65.

In the step S65, the timer means subtracts a reference value STref from the timer value ST.

In the step S66, the decision means 1c determines whether there is a piece in the uppermost row or not. If there is a piece in the uppermost row (YES), then control goes to a step S67. If not (NO), then control goes back to the step S9 shown in FIG. 16.

In the step S67, the CPU 1 processes a game-over procedure.

The video game system according to the third embodiment of the present invention offers the following features and advantages:

When there is a piece present in the uppermost row, a certain period of time is given to the game player, and if pieces can be removed from the uppermost row within the certain period of time that is given, the game is prevented from ending. Therefore, the game player finds the game more interesting and fun.

Figure 36:
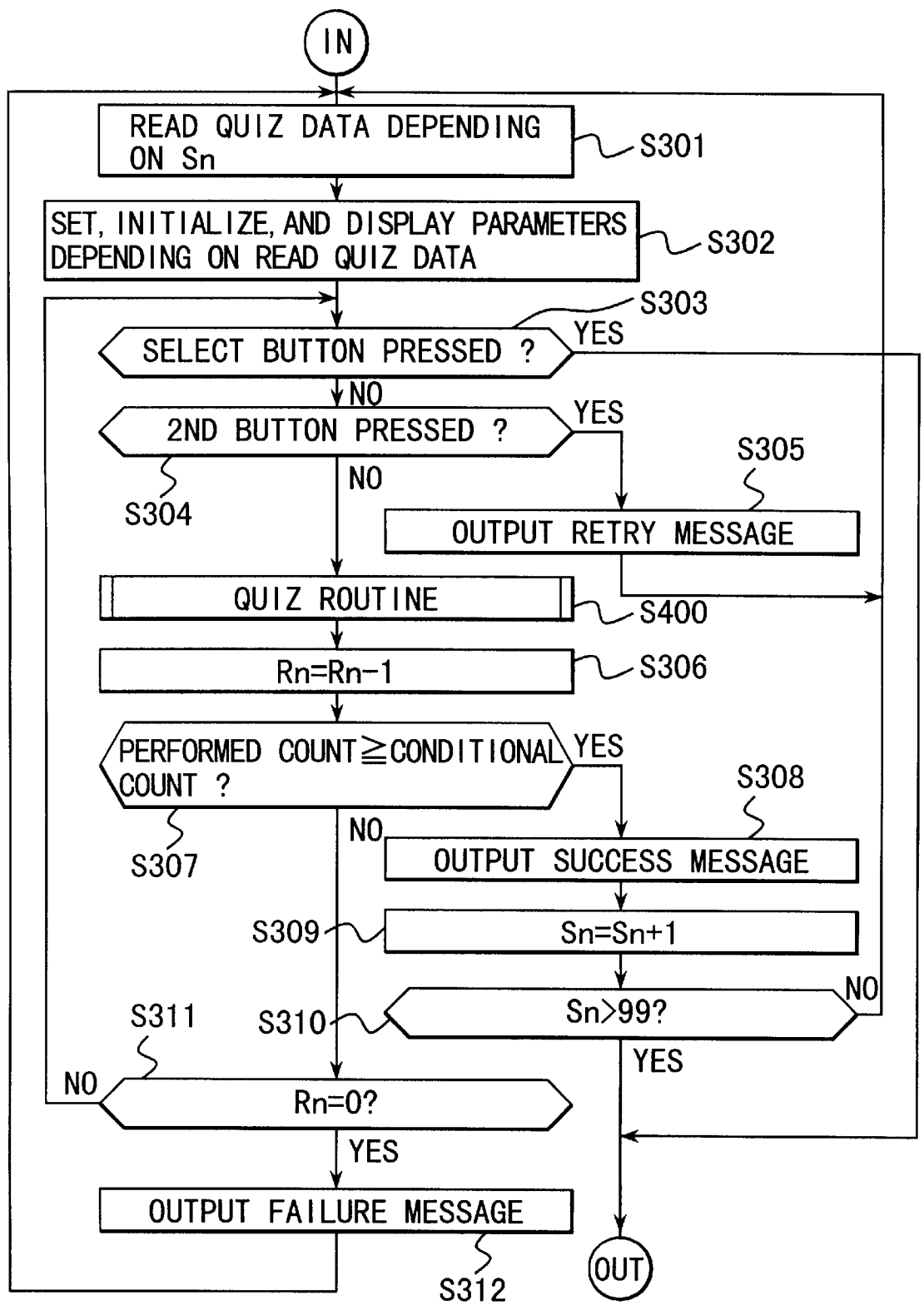
FIGS. 36 through 38 are a flowchart of a control sequence in the quiz mode of the video game system according to the fourth embodiment.
Figure 37:
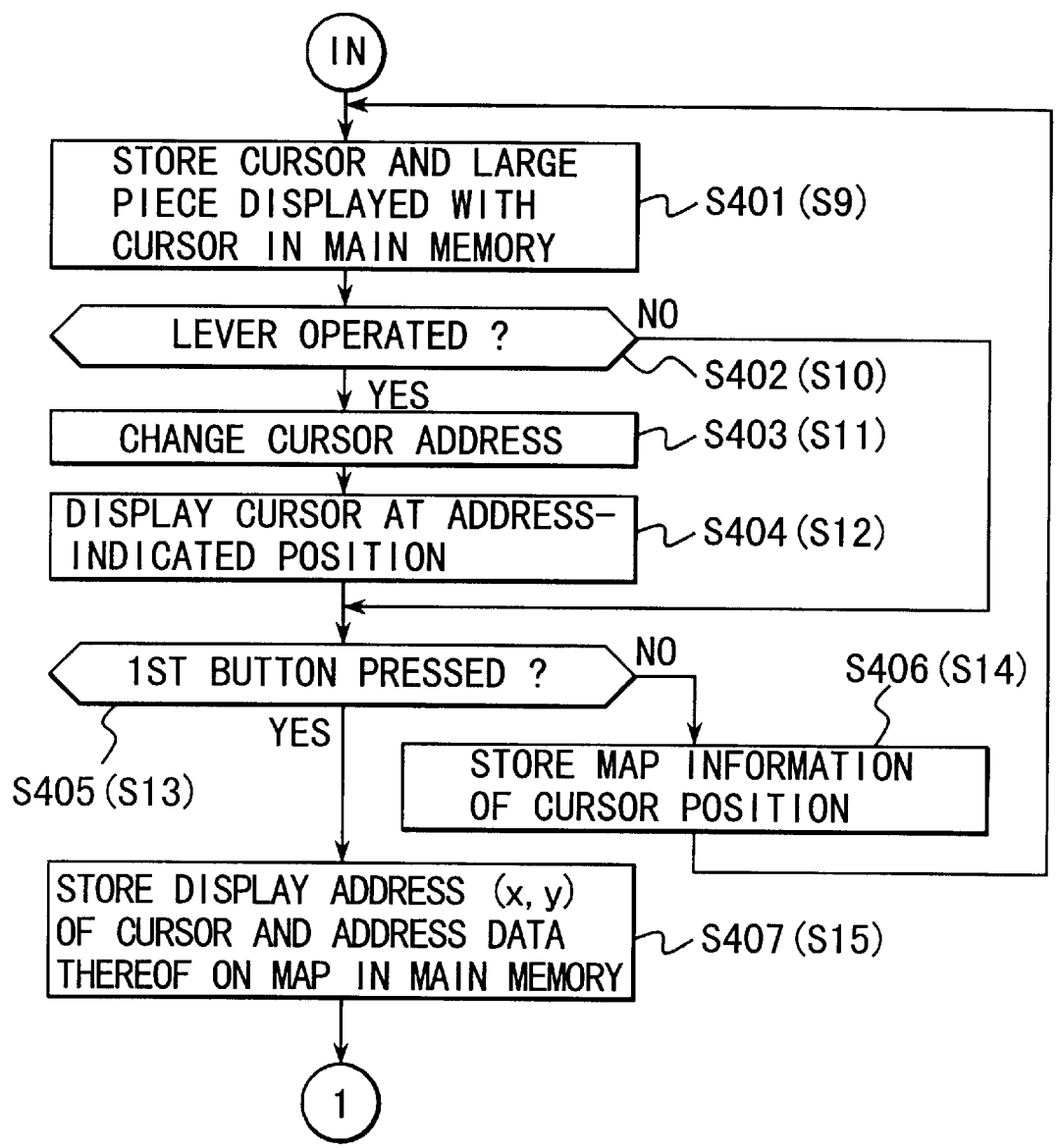
Figure 38:
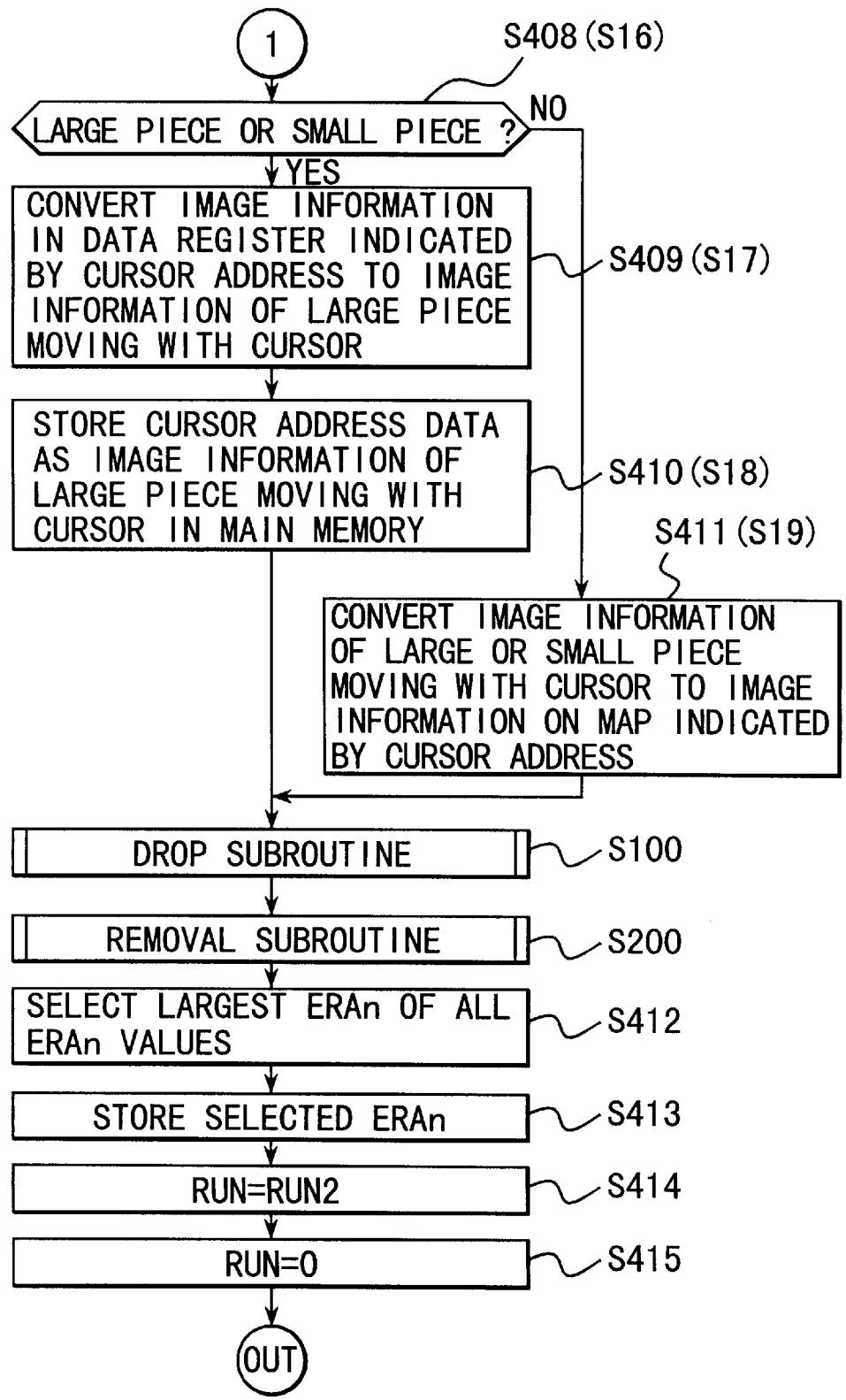

4th Embodiment:

A video game system according to a fourth embodiment of the present invention will be described below with reference to FIGS. 29 through 38. FIGS. 29 through 35 show by way of example displayed images in a quiz mode of the video game system according to the fourth embodiment, and FIGS. 36 through 38 show a control sequence in the quiz mode of the video game system according to the fourth embodiment.

Figure 29:
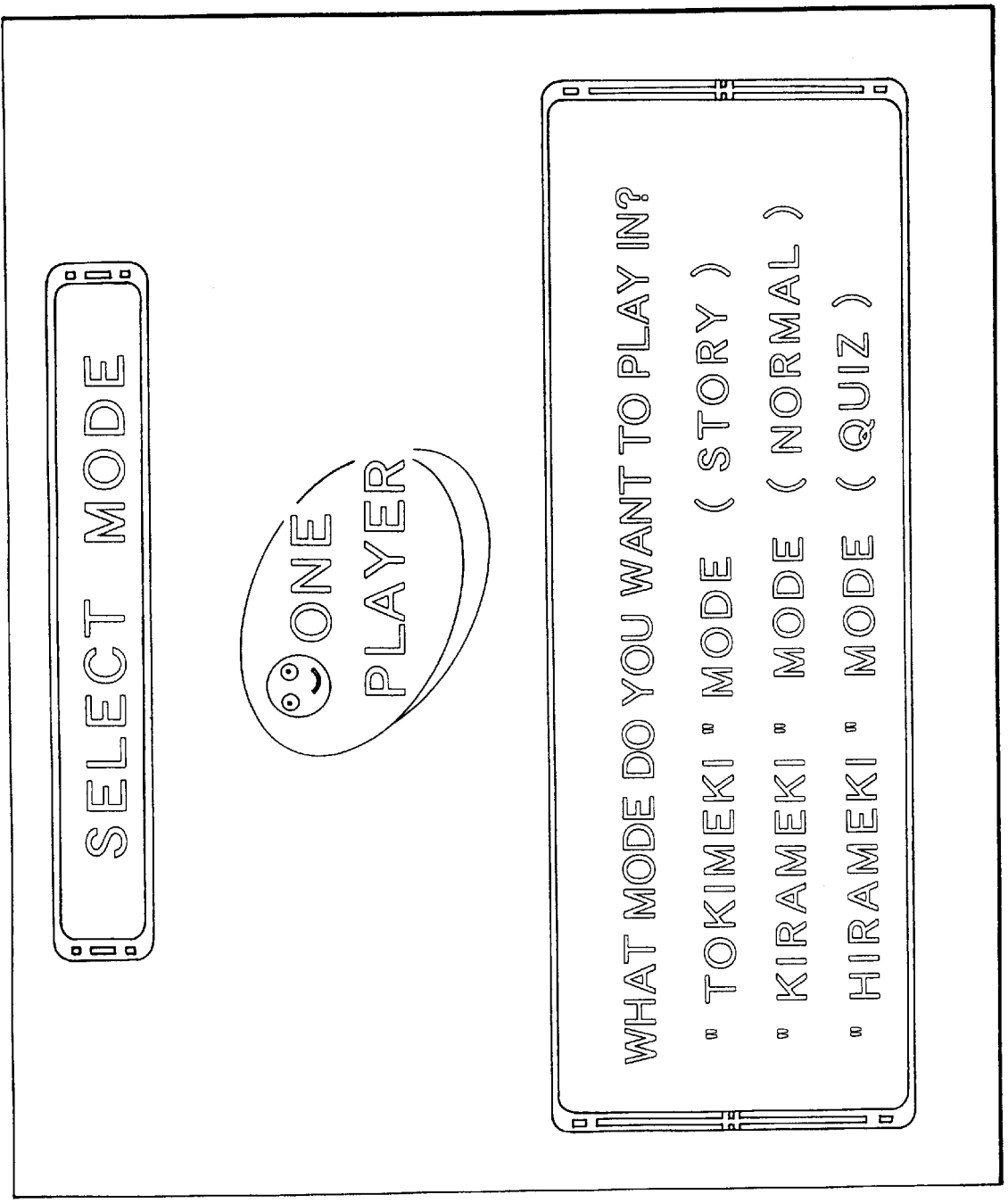
FIGS. 29 through 35 are views showing by way of example displayed images in a quiz mode of a video game system according to a fourth embodiment of the present invention.
Figure 30:
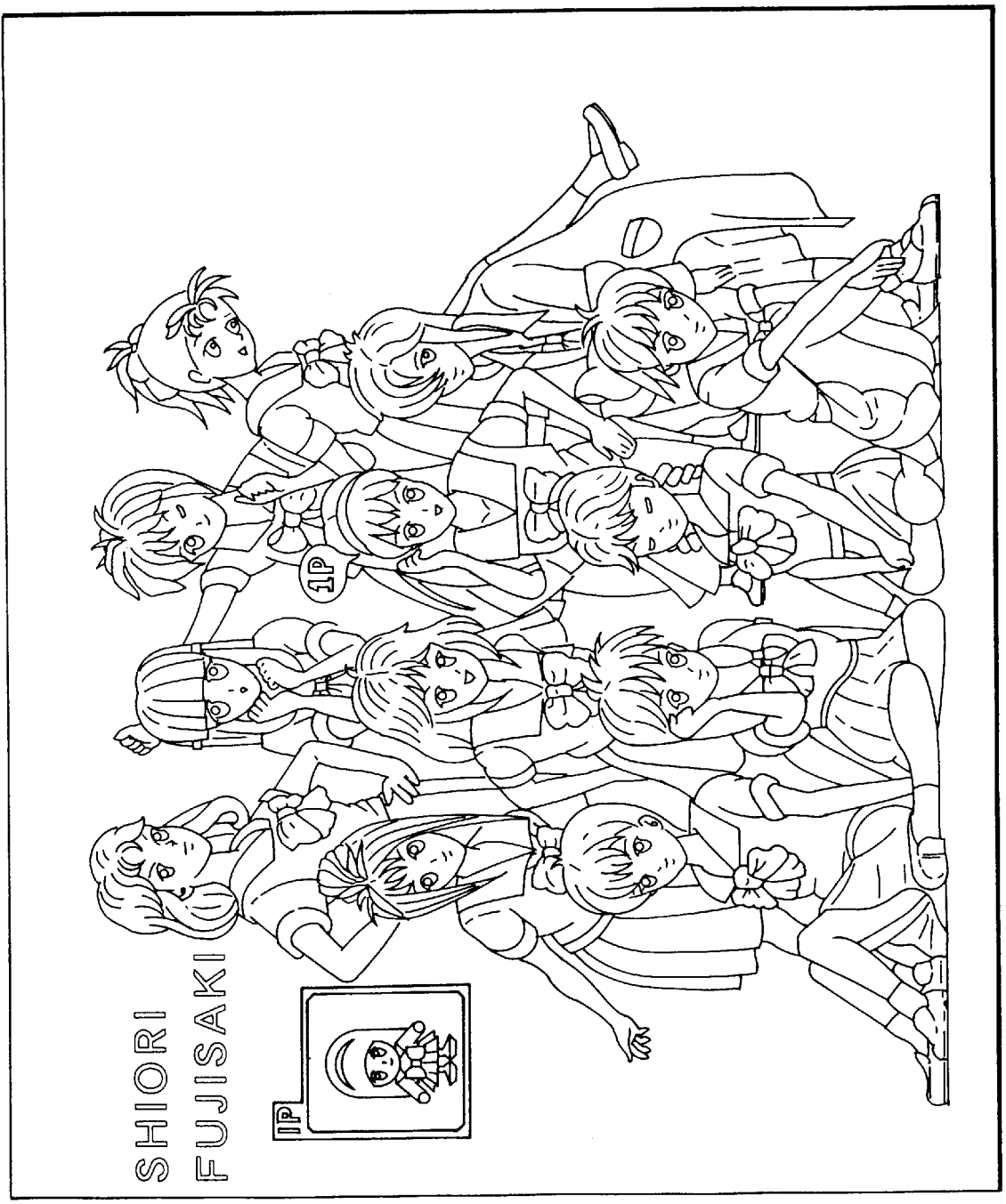
Figure 31:
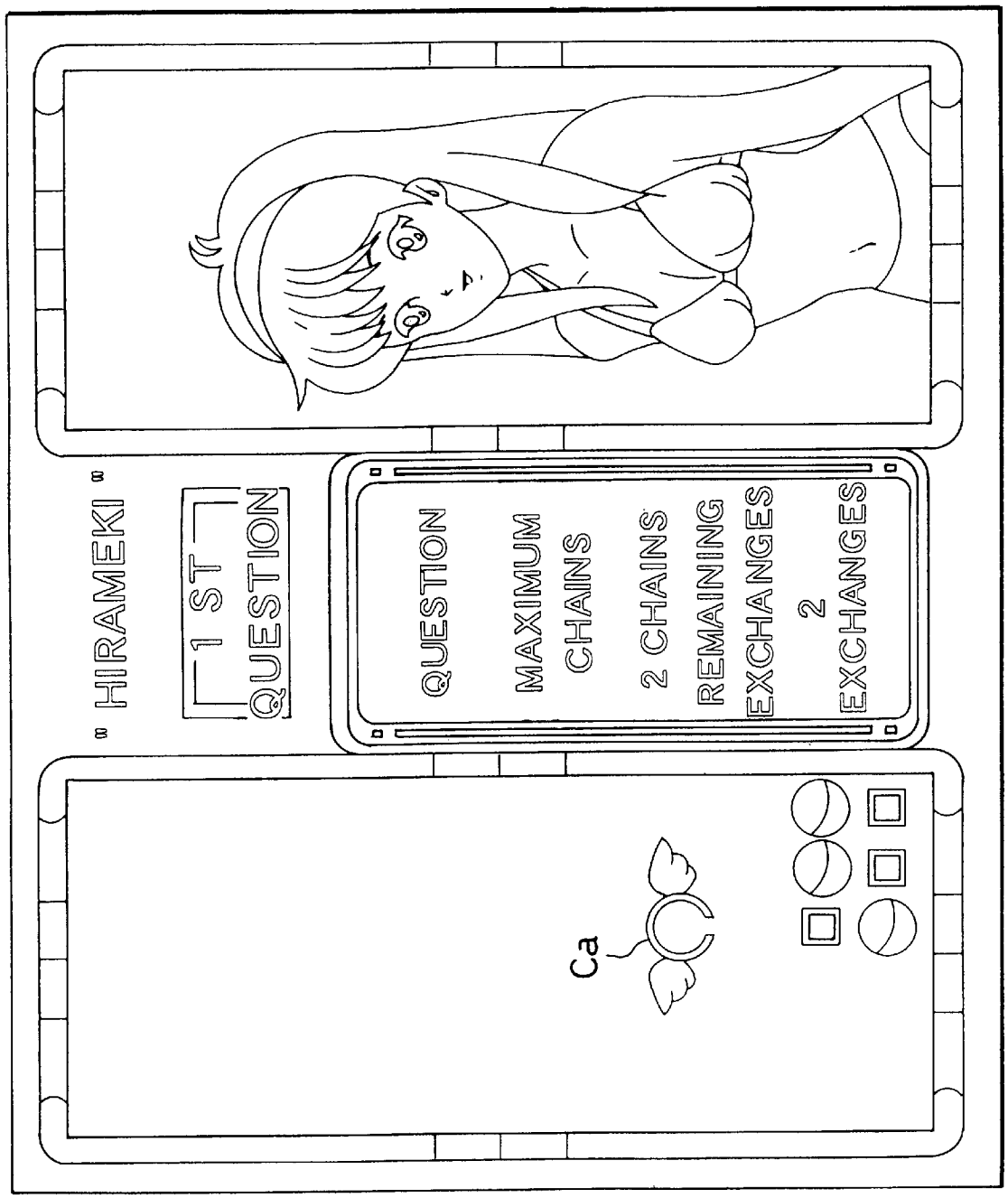

The game selection image displayed on the display screen of the television monitor 12 in the step S3 shown in FIG. 16 includes a quiz mode (displayed as "HIRAMEKI" MODE (QUIZ) in FIG. 29). When the quiz mode is selected, the display screen also displays a selection image for selecting characters to be displayed in the quiz mode, as shown in FIG. 30. If the quiz mode is selected in the step S3, a character (CHR1, for example) is selected in the selection image shown in FIG. 30, and the start button is pressed in the step S4, then the quiz mode is set in the step S5, and an initial image in the quiz mode as shown in FIG. 31 is outputted in the step S6. In the step S7, flags and variables are initialized. Thereafter, the video game progresses in the quiz mode. The control sequence in the quiz mode will be described below.

In the initial image in the quiz mode shown in FIG. 31, a first question is displayed. In the initial image, an image of the selected character CHR1 is displayed in a right area so as to move depending on how the game player plays the video game. The initial image also displays in a left area thereof pieces depending on the quiz. In FIG. 31, large pieces are displayed as large circles, and small pieces as small squares. These pieces are captured by a cursor, and exchanged for other pieces in the field. In the first question shown in FIG. 31, "QUESTION" is to solve "2 CHAINS" and "2 EXCHANGES." The displayed pieces include three large pieces and three small pieces which are of the same color (shown as hatched).

The letters "MAXIMUM CHAINS" displayed below "QUESTION" represent the number of chains to be made. In this example, a condition that two or more chains have to be satisfied needs to be satisfied in order to remove the pieces from the field. The letters "REMAINING EXCHANGES" displayed below "2 CHAINS" represent the number Rn of exchanges to be made, and the letters "2 EXCHANGES" are displayed below "REMAINING EXCHANGES." In this example, the above condition has to be satisfied within the number Rn of exchanges being "2." As described above, the term "exchange" used herein includes (1) holding a piece present in the field with the cursor, (2) returning a piece held by the cursor to the field, or (3) an exchange between a piece present in the field and a piece held by the cursor.

The above condition can be satisfied as follows: The game player moves a cursor Ca to the position of a large piece at the left end of the lower row, and presses the first button 22c to hold the large piece with the cursor Ca (first exchange). A small piece at the left end of the upper row now drops to the position of the large piece held by the cursor Ca. The game player then moves the cursor Ca to the empty position from which the small piece has dropped, i.e., the position at the left end of the upper row and also the large piece held by the cursor Ca. When the game player presses the first button 22c (second exchange), three large pieces of the same color are connected in the upper row. Therefore, these three large pieces are removed from the field. This process is referred to as a first chain. Then, when these three large pieces are removed from the field, small pieces in the lower row contiguous to the large pieces that have been removed are converted to large pieces of the same color. Since the large pieces converted from the small pieces are connected in the lower row, they are also removed from the field. This process is referred to as a second chain. Accordingly, the two chains given as the condition are cleared with the two exchanges.

In a step S301 shown in FIG. 36, the variable setting means reads quiz data depending on a quiz stage number Sn. The quiz stage number Sn is initialized to a default value of "1" and has a maximum value of "99." The quiz data comprises piece location data and clear condition data. There are as many quiz data types as the quiz stage number Sn, i.e., 99 quiz data types. The clear condition data may be either a chain count RUN2 and an exchange count Rn or a simultaneous removal count ERAn and an exchange count Rn which are selected. The exchange count Rn is counted when a piece is held or exchanged. The exchange count Rn is not counted when the button is pressed for exchange in a piece-free area in the field if no piece is held by the cursor.

In a step S302, the variable setting means 1b sets, initializes, and displays parameters depending on the read quiz data.

In a step S303, the button operation detecting means 1a determines whether the select button 22b is pressed or not. If the select button 22b is pressed (YES), then control leaves the control sequence shown in FIG. 36. If not (NO), then control goes to a step S304.

In the step S304, the button operation detecting means 1a determines whether the second button 22d is pressed or not. If the second button 22d is pressed (YES), then control goes to a step S305. If not (NO), then control goes to a step S400.

Figure 34:
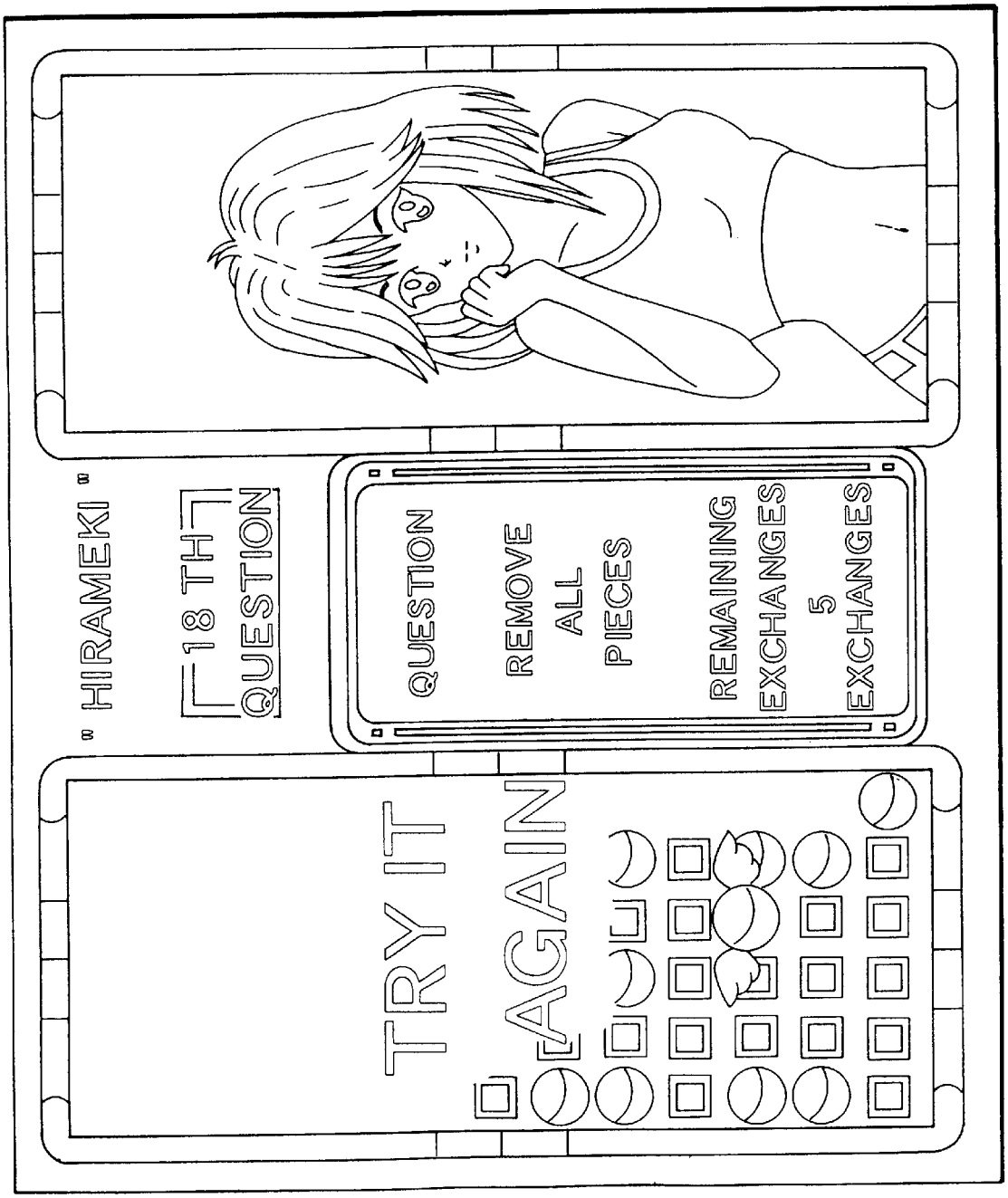
Figure 35:
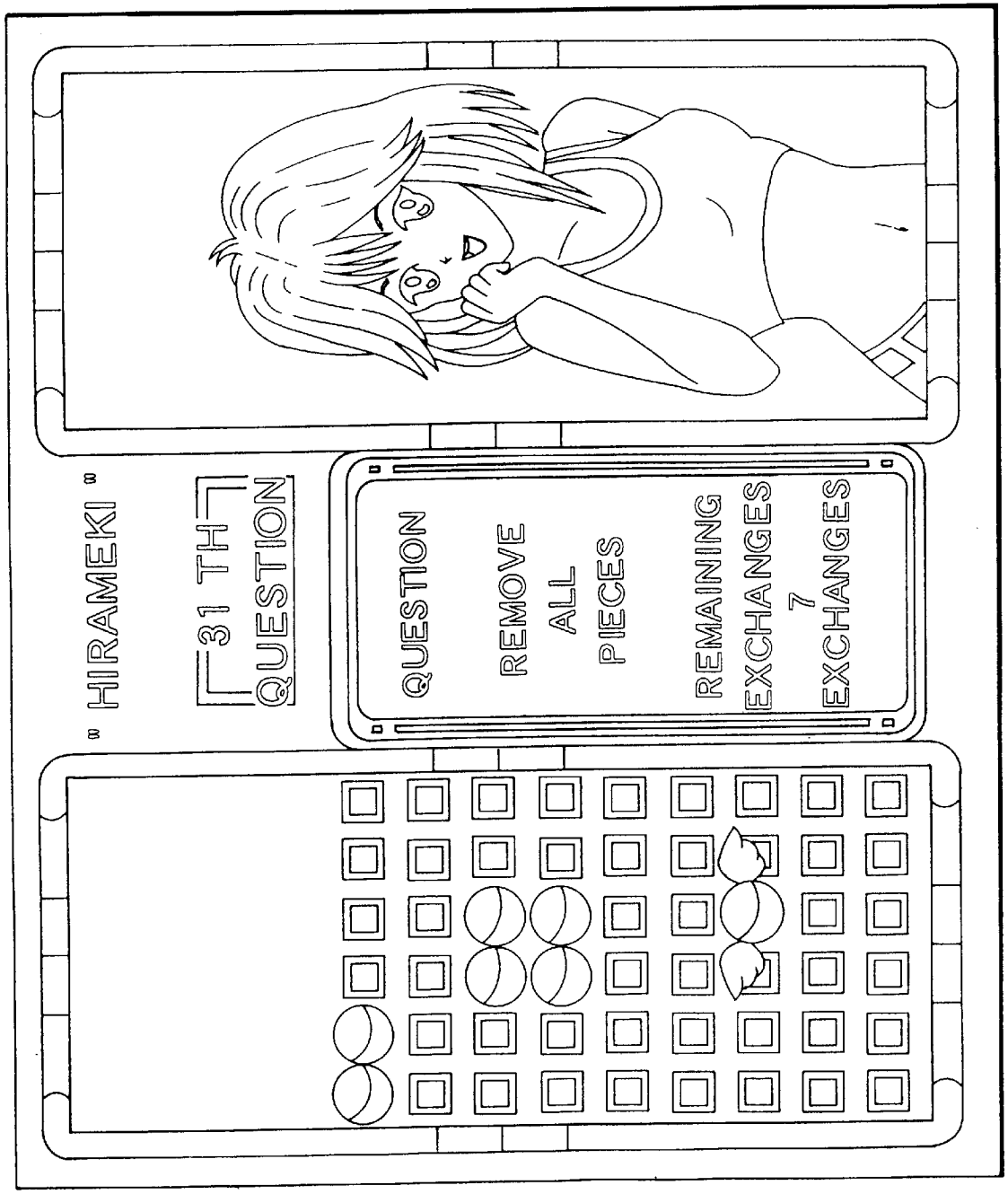

In the step S305, the result information outputting means 1n outputs a message indicating a retry (see FIG. 34). As shown in FIG. 34, the message comprises a letter message "TRY IT AGAIN." The letters "REMOVE ALL PIECES" in FIG. 34 signify removal of all displayed pieces, not only a piece held by the cursor, but also pieces present in the field.

In the step S400, a quiz subroutine shown in FIGS. 37 and 38 is executed.

In a next step S306, the calculating means 1d subtracts "1" from the exchange count Rn. The exchange count Rn is represented by the value of the exchange count Rn as the clear condition data in the quiz data read in the step S302.

In a step S307, the decision means 307 determines whether or not a performed count is equal to or greater than a conditional count. If the performed count is equal to or greater than the conditional count (YES), then control goes to a step S308. If not (NO), then control proceeds to a step S311. The performed count is either the chain count RUN generated by the game player or the simultaneous removal count ERAn, and the conditional count is either the chain count RUN2 in the quiz data or the simultaneous removal count ERAn.

Figure 33:
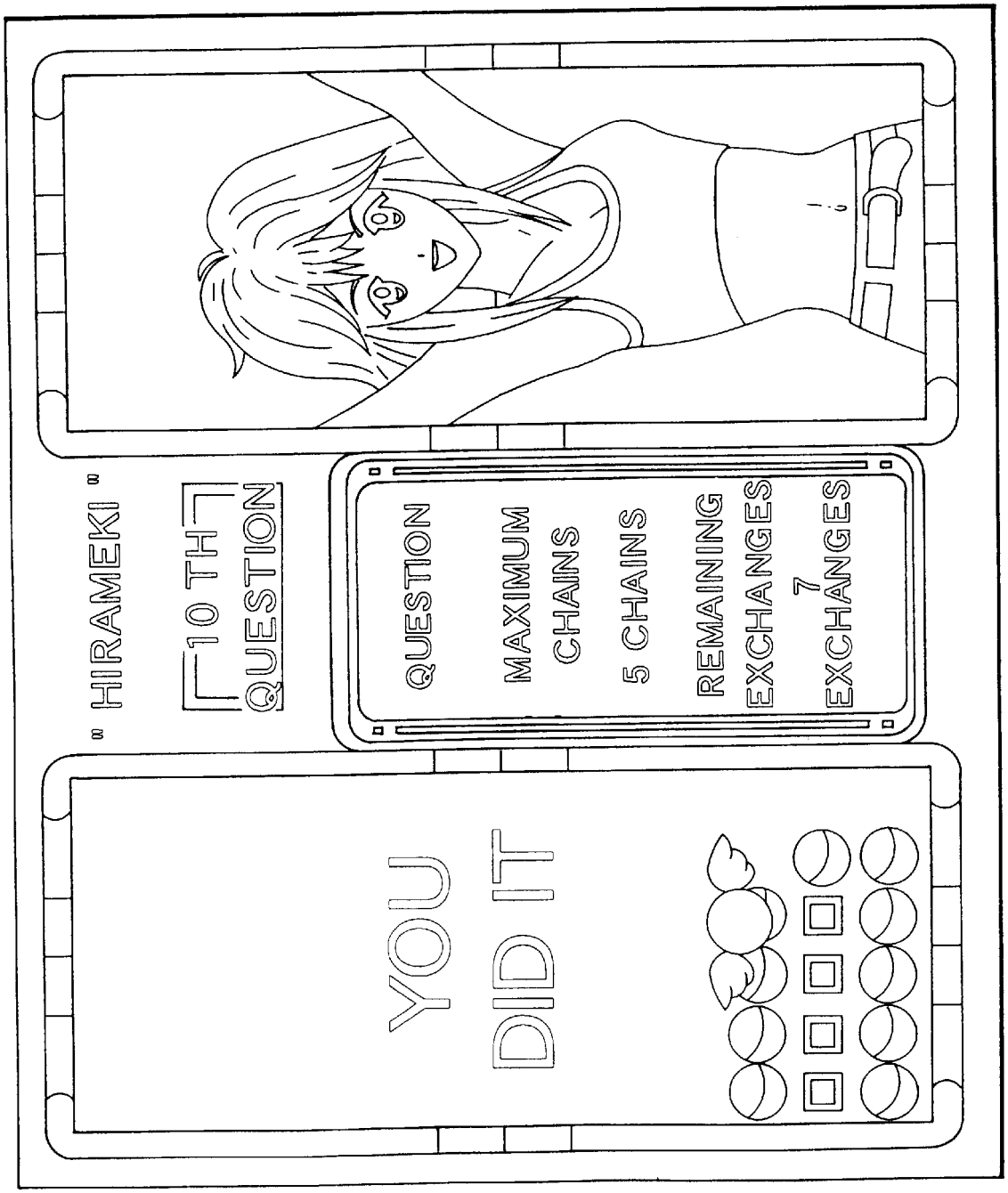

In the step S308, the result information outputting means 1n outputs a success message (see FIG. 33). As shown in FIG. 33, the success message comprises a letter message "YOU DID IT" and the character displayed in the right area gives a joyful expression.

In a step S309, the calculating means 1d adds "1" to the quiz stage number Sn.

In a step S310, the decision means 1c determines whether the quiz stage number Sn is greater than "99" or not. If the quiz stage number Sn is greater than "99" (YES), control leaves the control sequence shown in FIG. 36. If not (NO), control returns to the step S301.

In the step S311, the decision means 1c determines whether the exchange count Rn is "0" or not. If the exchange count Rn is "0" (YES), control goes to a step S312. If not (NO), then control goes back to the step S303.

Figure 32:
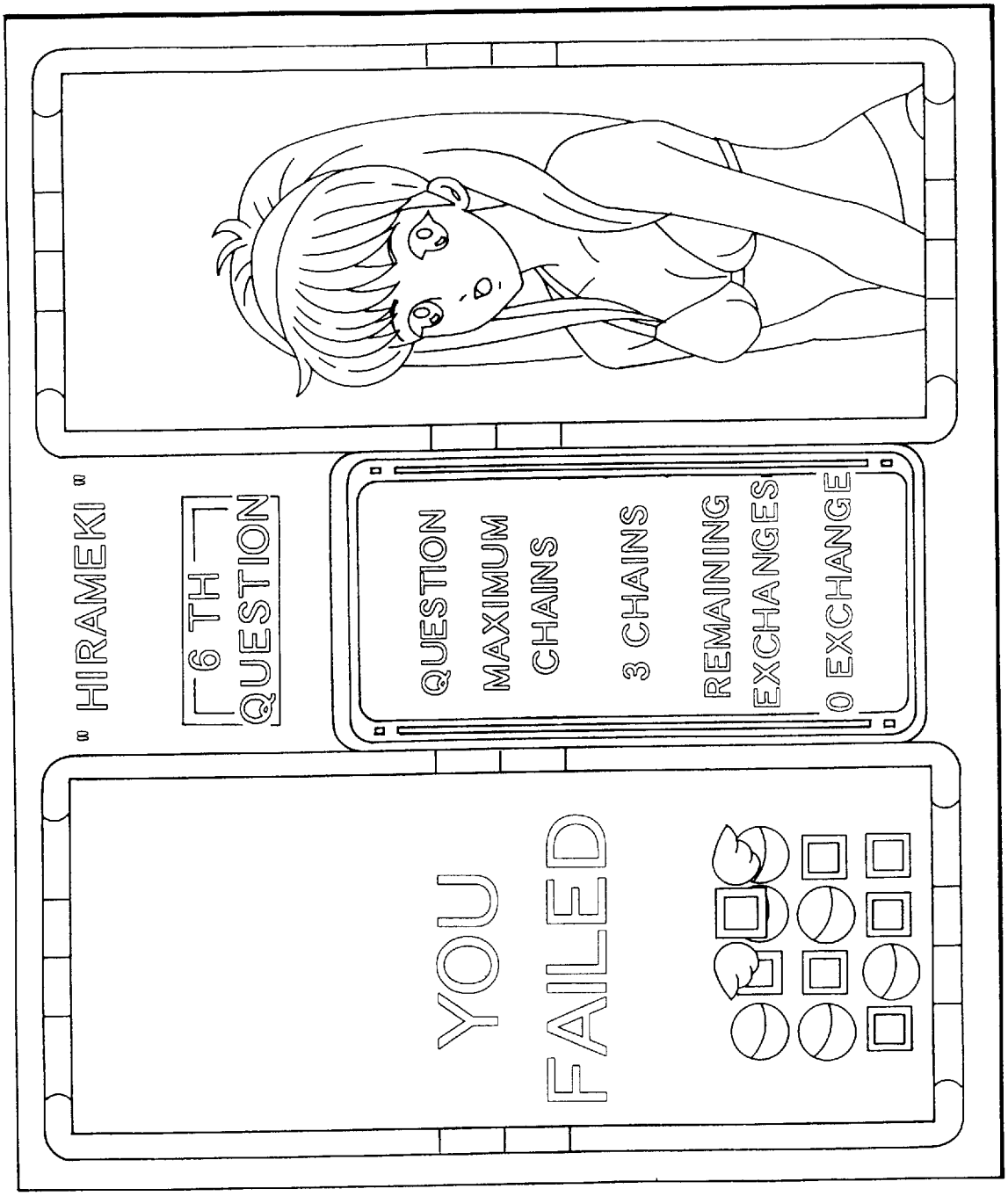

In the step S312, the result information outputting means 1n outputs a failure message (see FIG. 32). As shown in FIG. 32, the success message comprises a letter message "YOU FAILED" and the character displayed in the right area gives a dissatisfied look.

The quiz subroutine in the step S400 will be described below with reference to FIGS. 37 and 38. Those steps of the quiz subroutine which are identical to those shown in FIGS. 16 through 20 are denoted by identical reference numerals in parentheses, and will not be described in detail below.

In a step S412, the decision means 1c selects the largest one of all simultaneous removal counts ERAn (n=1, 2, 3, . . . ).

In a step S413, the removal count ERAn selected by the decision means 1c is stored.

In a step S414, the variable setting means 1b substitutes the chain count RUN in the chain count RUN2.

In a step S415, the variable setting means 1b sets the chain count RUN to "0".

The video game system according to the fourth embodiment of the present invention offers the following features and advantages:

A certain condition is established, and it is determined whether the game player has satisfied the established condition. The video game proceeds to a next stage only when the game player has satisfied the established condition. Consequently, the game player is given much incentive to play the video game.

Although certain preferred embodiments of the present invention have been shown and described in detail, it should be understood that various changes and modifications may be made therein without departing from the scope of the appended claims.

What is claimed is:

1. A method of moving an object in a video game, comprising the steps of:

moving objects successively introduced into a game field in one direction on a display screen;

determining whether a leading object or a leading cluster of objects introduced into the game field reach a predetermined position in the display screen or a memory;

ending the video game if the leading object or the leading cluster of objects introduced into the game field reaches said predetermined position;

determining whether objects of one type are successively connected in the game field;

removing the objects of one type from the game field if they are successively connected in the game field; and exchanging an object indicated by a cursor for an object present in the game field.

2. A method according to claim 1, wherein the objects are available in different types including different shapes, different colors, different patterns, or combinations of different shapes, different colors, and different patterns.

3. A method according to claim 1, wherein the display screen has at least two display areas each for displaying the objects processed in the video game.

4. A method according to claim 3, further comprising the step of:

adding as many objects as the number of objects removed from the game field in one of said display areas to the game field in the other of the display areas.

5. A method according to claim 1, wherein said objects comprise a first group of objects removable from said game field and a second group of objects unremovable from said game field.

6. A method according to claim 5, further comprising the step of:

converting any one of said objects belonging to the second group to an object belonging to said first group if said one of the objects belonging to the second group is positioned contiguous to one of the objects removed from said game field.

7. A method according to claim 1, wherein said cursor has a shape indicative of mobility, and is displayed partly or wholly in an animation mode.

8. A video game apparatus comprising:

a controller manually operable by a game player;

display means for displaying images on a display screen thereof;

a recording medium storing game program data; and control means for controlling a video game based on the game program data read from said recording medium and operation of said controller manually operated by the game player;

said control means comprising means controlled by said game program data, for:

moving objects successively introduced into a game field in one direction on said display screen;

determining whether a leading object or a leading cluster of objects introduced into the game field reach a predetermined position in the display screen or a memory;

ending the video game if the leading object or the leading cluster of objects introduced into the game field reaches said predetermined position;

determining whether objects of one type are successively connected rn the game field;

removing the objects of one type from the game field if they are successively connected in the game field; and exchanging an object indicated by a cursor for an object present in the game field.

9. A game apparatus according to claim 8, wherein the objects are available in different types including different shapes, different colors, different patterns, or combinations of different shapes, different colors, and different patterns.

10. A game apparatus according to claim 8, wherein the display screen has at least two display areas each for displaying the objects processed in the video game.

11. A game apparatus according to claim 10, wherein said control means comprises means controlled by said game program data, for adding as many objects as the number of objects removed from the game field in one of said display areas to the game field in the other of the display areas.

12. A game apparatus according to claim 8, wherein said objects comprise a first group of objects removable from said game field and a second group of objects unremovable from said game field.

13. A game apparatus according to claim 12, wherein said control means comprises means controlled by said game program data, for converting any one of said objects belonging to the second group to an object belonging to said first group if said one of the objects belonging to the second group is positioned contiguous to one of the objects removed from said game field.

14. A game apparatus according to claim 8, wherein said cursor has a shape indicative of mobility, and is displayed partly or wholly in an animation mode.

15. A game apparatus according to claim 8, wherein said control means comprises means controlled by said game program data, for:

measuring a predetermined period of time if the leading object or the leading cluster of objects introduced into the game field reaches said predetermined position;

determining whether a condition for ending the video game is satisfied upon elapse of said predetermined period of time; and preventing the video game from being ended if said condition is not satisfied.

16. A video game system for moving an object in a video game, comprising:

display means for displaying a game field on a display screen thereof;

a controller manually operable by a game player for controlling a cursor in the game field displayed by said display means; and control means for moving objects successively introduced into a game field in one direction on said display screen, determining whether a leading object or a leading cluster of objects introduced into the game field reach a predetermined position in the display screen or a memory, ending the video game if the leading object or the leading cluster of objects introduced into the game field reaches said predetermined position, determining whether objects of one type are successively connected in the game field or not, removing the objects of one type from the game field if they are successively connected in the game field, and exchanging an object indicated by the cursor for an object present in the game field.

17. A video game system according to claim 16, wherein the objects are available in different types including different shapes, different colors, different patterns, or combinations of different shapes, different colors, and different patterns.

18. A video game system according to claim 16, wherein the display screen has at least two display areas each for displaying the objects processed in the video game.

19. A video game system according to claim 18, wherein said control means comprises means controlled by said game program data, for adding as many objects as the number of objects removed from the game field in one of said display areas to the game field in the other of the display areas.

20. A video game system according to claim 19, wherein said objects comprise a first group of objects removable from said game field and a second group of objects unremovable from said game field.

21. A video game system according to claim 20, wherein said control means comprises:

decision means controlled by said game program data, for determining whether an object contiguous to the objects removed from said game field belongs to said first group or said second group; and converting means for converting any one of said objects belonging to the second group to an object belonging to said first group if said one of the objects belonging to the second group is positioned contiguous to one of the objects removed from said game field, as determined by said decision means.

22. A video game system according to claim 16, wherein said cursor has a shape indicative of mobility, and is displayed partly or wholly in an animation mode.

23. A recording medium storing game program data readable by a computer for moving objects successively introduced into a game field in one direction on said display screen, determining whether a leading object or a leading cluster of objects introduced into the game field reach a predetermined position in the display screen or a memory, ending the video game if the leading object or the leading cluster of objects introduced into the game field reaches said predetermined position, determining whether objects of one type are successively connected in the game field, removing the objects of one type from the game field if they are successively connected in the game field, exchanging an object indicated by the cursor for an object present in the game field removing objects from the image field if the objects of the same type as the object positioned in said position are successively connected, measuring a predetermined period of time, moving an object in the game field by a predetermined distance in said direction if said predetermined period of time is measured, determining whether there is a leading piece in the game field in said direction, and determining that the game is to be ended if there is a leading piece as determined in the game field in said direction.

24. A recording medium according to claim 23, wherein said game program data includes data for measuring said predetermined period of time after the game is determined as being ended, determining whether the game is to be ended again upon elapse of said predetermined period of time, and preventing the game from being ended if the game is not to be ended.

25. A recording medium according to claim 23, wherein the objects are available in different types including different shapes, different colors, different patterns, or combinations of different shapes, different colors, and different patterns.

26. A recording medium according to claim 23, wherein the display screen has at least two display areas each for displaying the objects processed in the video game.

27. A recording medium according to claim 26, wherein said game program data includes data for adding as many objects as the number of objects removed from the game field in one of said display areas to the game field in the other of the display areas.

28. A recording medium according to claim 23, wherein said objects comprise a first group of objects removable from said game field and a second group of objects unremovable from said game field.

29. A recording medium according to claim 23, wherein said game program data includes data for:
determining whether an object contiguous to the objects removed from said game field belongs to said first group or said second group; and
converting means for converting any one of said objects belonging to the second group to an object belonging to said first group if said one of the objects belonging to the second group is determined as being positioned contiguous to one of the objects removed from said game field.

30. A recording medium according to claim 23, wherein said cursor has a shape indicative of mobility, and is displayed partly or wholly in an animation mode.

31. A video game apparatus comprising:
means for changing positions of objects displayed in a game field on a display screen;
means for removing objects of one type from the game field if the objects are successively connected;
means for establishing a condition to remove objects from the game field, displaying at least as many objects as the number of objects removable under said conditions in a pattern removable under said condition, and determining whether said condition is satisfied by a game player of the video game apparatus; and
a device for exchanging an object indicated by a cursor for an object present in the game field.

32. A video game apparatus according to claim 31, wherein said condition comprises either a chain count indicative of the number of removable chains of objects, a maximum number of objects which can be removed in one chain, a movement or exchange count indicative of the number of movements or exchanges of objects, or a combination of the chain count, the maximum number of objects, and the movement or exchange count.

33. A video game apparatus according to claim 31, wherein the objects are available in different types including different shapes, different colors, different patterns, or combinations of different shapes, different colors, and different patterns.

34. A video game apparatus according to claim 31, wherein said objects comprise a first group of objects removable from said game field and a second group of objects unremovable from said game field.

35. A video game apparatus according to claim 31, wherein said cursor has a shape indicative of mobility, and is displayed partly or wholly in an animation mode.

36. A video game apparatus comprising:
a controller manually operable by a game player;
display means for displaying images on a display screen thereof;
a recording medium storing game program data readable by a computer; and
control means for controlling a video game based on the game program data read from said recording medium and operation of said controller manually operated by the game player;
said control means comprising means controlled by said game program data, for:
establishing a condition for removing objects from a game field on the display screen;
determining whether objects of one type are successively connected;
removing objects of one type if the objects of one type are determined as being successively connected;
exchanging an object indicated by a cursor for an object in the game field; and
determining whether the objects are removed from the game field under said condition.

37. A video game apparatus according to claim 36, wherein the objects are available in different types including different shapes, different colors, different patterns, or combinations of different shapes, different colors, and different patterns.

38. A video game apparatus according to claim 36, wherein said objects comprise a first group of objects removable from said game field and a second group of objects unremovable from said game field.

39. A video game apparatus according to claim 36, wherein said control means comprising means controlled by said game program data, for converting any one of said objects belonging to the second group to an object belonging to said first group if said one of the objects belonging to the second group is positioned contiguous to one of the objects removed from said game field.

40. A video game apparatus according to claim 36, wherein said cursor has a shape indicative of mobility, and is displayed partly or wholly in an animation mode.

41. A video game apparatus according to claim 36, further comprising result indicating means for indicating a result based on a decision as to whether the objects are removed from the game field under said condition.

42. A recording medium storing game program data readable by a computer for changing positions of objects displayed in a game field on a display screen, removing objects of one type from the game field if the objects are successively connected, establishing a condition to remove objects from the game field, determining whether objects of one type are successively connected, removing objects of one type from the game field if the objects of one type are determined as being successively connected, exchanging an object indicated by a cursor for an object in the game field, and determining whether the objects are removed from the game field under said condition.

43. A recording medium according to claim 42, wherein the objects are available in different types including different shapes, different colors, different patterns, or combinations of different shapes, different colors, and different patterns.

44. A recording medium according to claim 42, wherein said objects comprise a first group of objects removable from said game field and a second group of objects unremovable from said game field.

45. A recording medium according to claim 44, wherein said game program data includes data for:
   determining whether an object contiguous to the objects removed from said game field belongs to said first group or said second group; and
   converting means for converting any one of said objects belonging to the second group to an object belonging to said first group if said one of the objects belonging to the second group is determined as being positioned contiguous to one of the objects removed from said game field.

46. A recording medium according to claim 42, wherein said game program data includes data for indicating a result based on a decision as to whether the objects are removed from the game field under said condition.

* * * * *